(12) United States Patent
Gupta et al.

(10) Patent No.: US 6,233,538 B1
(45) Date of Patent: May 15, 2001

(54) APPARATUS AND METHOD FOR MULTI-PURPOSE SETUP PLANNING FOR SHEET METAL BENDING OPERATIONS

(75) Inventors: Satyandra Kumar Gupta; David Alan Bourne, both of Pittsburgh, PA (US)

(73) Assignee: Amada America, Inc., Buena Park, CA (US)

( * ) Notice: Subject to any disclaimer, the term of this patent is extended or adjusted under 35 U.S.C. 154(b) by 0 days.

(21) Appl. No.: 08/927,291

(22) Filed: Sep. 11, 1997

(51) Int. Cl.$^7$ ...................................................... G06G 7/48
(52) U.S. Cl. ...................................................... 703/6; 703/7
(58) Field of Search .................... 395/500.28, 500.27; 703/6–7

(56) References Cited

U.S. PATENT DOCUMENTS

| | | | |
|---|---|---|---|
| 4,888,692 | * 12/1989 | Gupta et al. ............................. | 700/96 |
| 4,912,644 | 3/1990 | Aoyama et al. . | |
| 5,005,394 | 4/1991 | Sartorio et al. . | |
| 5,029,462 | 7/1991 | Wakahara et al. . | |
| 5,047,916 | 9/1991 | Kondo . | |
| 5,083,256 | 1/1992 | Trovato et al. . | |
| 5,089,970 | 2/1992 | Lee et al. . | |
| 5,115,400 | 5/1992 | Watanabe et al. . | |
| 5,187,958 | 2/1993 | Prunotto et al. . | |
| 5,287,433 | 2/1994 | Prunotto et al. . | |
| 5,297,054 | 3/1994 | Kienzle et al. . | |
| 5,307,282 | 4/1994 | Conradson et al. . | |
| 5,315,522 | 5/1994 | Kauffman et al. . | |
| 5,396,265 | 3/1995 | Ulrich et al. . | |
| 5,432,887 | * 7/1995 | Khaw ...................................... | 706/19 |
| 5,434,791 | 7/1995 | Koko et al. . | |
| 5,453,933 | 9/1995 | Wright et al. . | |
| 5,485,390 | 1/1996 | LeClair et al. . | |
| 5,587,914 | 12/1996 | Conradson et al. . | |
| 5,642,291 | 6/1997 | Prunotto et al. . | |
| 5,822,207 | * 10/1998 | Hazama et al. ......................... | 700/97 |
| 5,971,585 | * 10/1999 | Dangat et al. .......................... | 700/102 |

FOREIGN PATENT DOCUMENTS

| | | |
|---|---|---|
| 0335314 | 10/1989 | (EP) . |
| 0355454 | 2/1990 | (EP) . |
| 0397904 | 11/1990 | (EP) . |
| 0402475 | 12/1990 | (EP) . |
| 0419013 | 3/1991 | (EP) . |

OTHER PUBLICATIONS

*Amada Windows Unfold: Manual for Cadkey* , Table of Contents, pp. 1–35, and Index, U.S. Amada Ltd., Buena Park, CA (Nov. 1995).

Bourne, David A.,Intelligent Manufacturing Workstations, *Knowledge–Based Automation of Processes* , Session at the 1992 ASME Winter Annual Meeting (Nov. 1992).

(List continued on next page.)

Primary Examiner—Kevin J. Teska
Assistant Examiner—Hugh Jones
(74) Attorney, Agent, or Firm—Greenblum & Bernstein, P.L.C.

(57) ABSTRACT

A setup planning technique is provided in which a family of parts to be manufactured is identified, and the setup constraints imposed by the various bending operations in the part family are determined. The setup constraints may define or describe spatial constraints on the sizes and locations of various tooling stages in the setup. After identifying setup constraints, setup plans are generated that satisfy all setup constraints. Any setup plan that satisfies all setup constraints may then be utilized to accommodate every part in the part family. Constraint propagation techniques may be utilized to identify compatible setup constraints and create setup plans. According to the various features and aspects of the invention, dissimilar sheet metal parts can share setups, and the need for extra tooling and fixturing may be minimized. Further, the present invention provides potential savings over state-of-the-art systems, and increases production capability and overall through-put of manufacturing facilities.

38 Claims, 19 Drawing Sheets

OTHER PUBLICATIONS

Wang, Cheng–Hua, "A Parallel Design System For Sheet Metal Parts", *Mechanical Engineering Report*, presented at the Mechanical Engineering Department, Carnegie Mellon University, Pittsburgh, PA (May 1992).

Wysong Literature, *The Perfect Forming Touch: New PH PLUS Series*, DNC Press Brakes, Cat. PHP–1, Wysong and Miles Company, Greensboro, NC (1993).

Bourne et al., David A., "Feature Exchange Language Programmer's Guide", Robotics Institute, Carnegie Mellon University (Jan. 1994).

Bourne, et al., David A., "The Operational Feature Exchange Language", *Technical Report CMU–RI–TR–90–06*, The Robotics Institute, Carnegie Mellon University (Mar. 1990).

*Amacom: AP40 Literature*, Version 4, Amada Company, Ltd. Japan (Jul. 1996).

*Amacom: AP60 Literature*, Amada Company, Ltd. Japan (Jul. 1996).

*Amacom: AP200 Literature*, Amada Company, Ltd. Japan (Jul. 1996).

"Bending Soft", Literature on the AMACOM AP40, No. 9112–01, Amada Company, Ltd., Japan (Date Unknown).

Bourne, et al., David A. "Using The Feature Exchange Language In The Next Generation Controller", *Technical Report CMU–RI–TR–90–19*, The Robotics Institute, Carnegie Mellon University (Aug. 1990).

Numao et al., "Scheplan–a scheduling expert for steel–making process", IEEE A1 '88; pp. 467–472 May 1988.*

Uckun et al., "Managing genetic search in job shop scheduling"; IEEE Expert; pp. 15–24 Oct. 1993.*

Gopalakrishnan et al.; "Product design for manufacturing: the use of knowledge based systems in concurrent engineering"; IEEE Int. Conf. Systems, Man and Cybernetics; pp. 566–568. Nov. 1990.*

Jain et al.; "Expert Simulation for on–line scheduling"; IEEE 1989 Winter Sim. Conf.; pp. 930–935 Dec. 1989.*

Nomura et al.; "A heuristics guided scheduling framework for domains with complex conditions"; IEEE 6th Int. Conf. Tools Art. Intell.; pp. 752–755. Nov. 1994.*

Arbon et al.; "Auto–MPS: an automated master production scheduling system for large volume manufacturing"; IEEE 10th Conf. Art. Intell. Applicat.; pp. 26–32 Mar. 1994.*

Levner et al.; "A tandem expert system for batch scheduling in a CIM system based on group technology concepts"; 95 INRIA/IEEE Symp. Emerg. Tech. and Factory Automat.; pp. 667–674. Oct. 1995.*

Niew at al.; "Knowledge based master production scheduler"; IEEE 1st. Int. Conf. Expert Planning Sys.; pp. 88–93 1990.*

Readdie; "A prototype Al–based tool for production scheduling"; IEE Coll. Art. Intell. in Planning for Product. Control; pp. 2/1–2/4 1988.*

Ohkura et al.; "Semiconductor process line scheduling expert system"; IEEE/UCS/SEMI Int. Symp. Semi. Manufact.; pp. 89–92 Sep. 1995.*

Tomastik et al.; "Optimization–based scheduling of flexible manufacturing systems for apparel production"; 34th IEEE Conf. Decision and Control; pp. 3152–3157 Dec. 1995.*

* cited by examiner

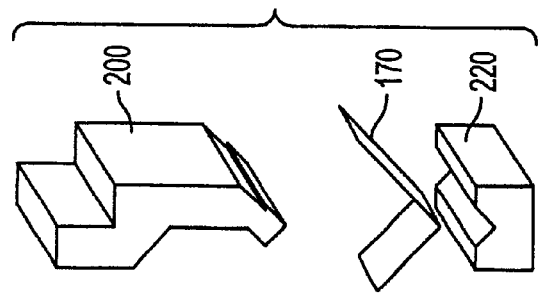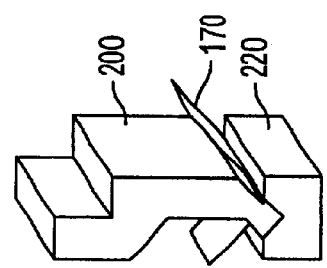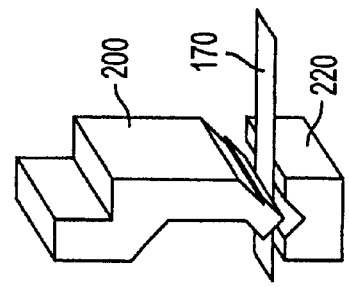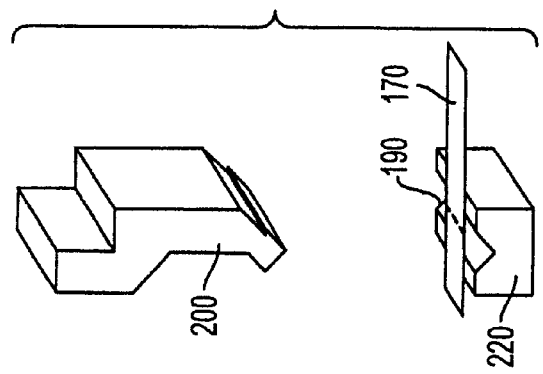

Setup constraint parameters

APPARATUS AND METHOD FOR MULTI-PURPOSE SETUP PLANNING FOR SHEET METAL BENDING OPERATIONS

BACKGROUND OF THE INVENTION

1. Field of the Invention

The present invention generally relates to the field of manufacturing, and to the production of components, such as sheet metal components. More particularly, the present invention relates to an apparatus and method for performing multi-part setup planning for carrying out sheet metal operations, such as sheet metal bending operations.

2. Background Information

Traditionally, the production of bent sheet metal components involves a series of production and manufacturing stages. The first stage is a design stage during which a sheet metal part design is developed based on a customer's specifications. A customer's order will usually include the necessary product and design information so that the component may be manufactured by a facility. During the design stage, a sheet metal part design may be developed at a design office of the manufacturing facility using an appropriate computer-aided design (CAD) system. Based on a customer's specifications, a two-dimensional (2-D) model of the sheet metal part may be developed by a programmer with a CAD system. The 2-D model may include a flat view and one or more other perspective views of the sheet metal part, with bending line and/or dimensional information.

Before actual bending of the sheet metal component can take place, the part must first be punched and/or cut from initial sheet metal stock material. Computer numerical control (CNC) or numerical control (NC) systems are typically used to control and operate punch presses and/or plasma or laser cutting machinery to process the stock material. In order to facilitate processing of the stock material, a computer-aided manufacturing (CAM) system or CAD/CAM system can be used by a design programmer to generate control code based on the 2-D model. The control code may comprise a part program that is imported to and utilized by the punch press and/or cutting machinery to punch or cut the sheet metal components from the stock material.

The next stage in the production process is a bending planning stage. During this stage, a bending plan may be developed by a bending operator at, for example, the shop floor. The operator will normally be provided with the blueprint or 2-D drawing of the component, along with one or more samples of the cut or punched stock material. With these materials, the bending operator will develop a bending plan which includes a press brake setup and bending plan that define the tooling to be used and the sequence of bends to be performed. The bending workstation may include CNC metal bending machinery, such as a CNC press brake, that enables the operator to enter data and develop a bending code or program based on the bending plan.

Once the bending plan is developed, the operator will setup the workstation for initial testing of the bending sequence. During this testing stage, the punched or cut stock material will be manually loaded into the press brake and the press brake will be operated to execute the programmed sequence of bends on the workpiece. Based on the results of the initial runs of the press brake, the operator may modify the bending sequence by editing the bending program. Further testing will typically be conducted until the bent sheet metal component is within the required design specifications.

One of the final stages in the production process is the bending stage. After the bending plan has been developed and tested, the bending operator will setup the required tooling at the bending station and operate the press brake based on the bending plan and the stored bending program code. Job scheduling is also performed in order to ensure that the necessary amount of punched or cut stock material will be available on time at the bending station and so that other jobs will be completed by the requested delivery dates. After the final bent sheet metal parts have been produced, the parts may then be assembled and packaged for shipping to the customer.

The conventional production and manufacturing process described above suffers from several drawbacks and disadvantages. For example, considerable manufacturing time is normally spent during the development of the sheet metal part design and bending plan, since the development of the part design and bending plan is primarily performed by the design programmer and the bending operator, and relies heavily on the individual's knowledge, skill and experience. Further, conventional methods, such as those described above, are not capable of efficiently handling a wide variety of product variations and customized jobs for customers. Such prior attempts focus on the design and setup for individual parts, and do not have the capacity to simultaneously consider the setup for multiple parts. In addition, past attempts which relied upon a standard or generic setup to accommodate multiple parts, fail to consider the setup constraints imposed on each part. As a result, parts frequently can not be manufactured with such a standard setup, and additional manufacturing time is often spent developing a setup for unaccommodated parts.

In recent years, there have been developments and attempts to improve the conventional sheet metal manufacturing process and to improve efficiency of the overall process. For example, computer-based systems and robotic manipulators and controllers have been developed to provide a greater level of automation in the production process of sheet metal components. Further, research and development has taken place in the field of intelligent/expert systems for automatically generating and/or providing bending plan and other manufacturing information required to produce sheet metal components. For instance, U.S. patent application Ser. No. 08/386,369, entitled "Intelligent System For Generating And Executing A Sheet Metal Bending Plan", filed on Feb. 9, 1995, in the names of David A. BOURNE et al., the contents of which is expressly incorporated herein by reference in its entirety, discloses an intelligent, automated bending system which generates a bending plan and then executes the generated bending plan to produce a bend sheet metal component. The system disclosed therein includes one or more expert modules or subsystems for providing expert information, including tooling information, to a bend sequence planner, which determines and generates a final bending plan. A sequencer is also provided for executing the final generated plan, and for formulating and transmitting the appropriate commands to the various components within the bending workstation in order to produce the bend sheet metal components. In addition, U.S. patent application Ser. No.08/338,115, entitled "Method For Planning/Controlling Robot Motion", filed on Nov. 9, 1994, in the names of David A. BOURNE et al., the contents of which is expressly incorporated herein by reference in its entirety, discloses an expert system for planning controlling the motion of a robot in order to facilitate the production of sheet metal components.

A number of new technologies have also been developed, such as flexible manufacturing systems (FMS) and modular fixturing systems to handle the increase in product variations. These technologies focus on achieving process and material handling flexibility. For more information on such systems, see, for example, LUGGEN, W. W., *Flexible Manufacturing Cells and Systems,* Prentice Hall, Englewood Cliffs, N.J. (1991), and MALEKI, R. A., *Flexible Manufacturing Systems: The Technology and Management,* Prentice Hall, Englewood Cliffs, N.J. (1991). In addition, Group Technology (GT) has been used to create better shop layouts by identifying parts with similar process plans and producing them on the same production cells. In GT approaches, part families and production cells are formed based on the use of common machines. Additional information concerning GT systems may be found in, for example, SNEAD, C. S., *Group Technology: Foundations For Competitive Manufacturing,* Van Nostrand Reinhold, N.Y. (1989), and GROOVER, M. P., *Fundamentals of Modern Manufacturing: Materials, Processes and Systems,* Prentice Hall, Upper Saddle River, N.J. (1996).

While such prior systems have increased the flexibility and automation of manufacturing systems, such attempts have failed to adequately handle a wide variety of product variations and customized jobs for customers. For example, past attempts have given very little attention in exploiting commonality in tooling and fixturing across multiple parts. Most process planners currently handle one part at a time, attempting to find the best plan for each part. Such planners fail to identify commonality among parts and cannot select common tooling in fixtures that work for multiple parts. As a result of these limitations, such systems require more frequent setup changes and, therefore, reduce the overall through-put capability of the manufacturing system. Further, since machine setups are specified by selecting particular fixtures and tooling, the ordering of new fixtures or tools for every part increases manufacturing costs and contributes to non-value added operations.

Accordingly, in view of the drawbacks of such past attempts, there is a need for the ability to simultaneously plan for multiple parts to facilitate mass customization and to significantly improve and enhance the product realization process. Since setup changes constitute a major portion of the production time in batch production environments, there is a need for an improved setup planning technique that can significantly cut down the total number of setups and increase the overall through-put of the manufacturing facility. Current process planning systems focus on individual parts, and fail to exploit the commonality between setups for different parts that may be utilized to determine shared or composite setup plans to produce each of the parts. Further, with the increasing emphasis on more personalized products and shrinking product lives, there is a need for new manufacturing techniques for handling mass customization and a wider variety of product mix on the shop floors with increased product through-put.

SUMMARY OF THE INVENTION

In view of the foregoing, the present invention, through one or more of its various aspects, embodiments and/or specific features or sub-components thereof, is provided to bring about one or more objects and advantages, such as those specifically noted below.

A general object of the present invention is to provide greater efficiency and through-put in the manufacture of parts at, for example, a sheet metal manufacturing facility. A further object of the invention is to provide a setup planning technique for sheet metal bending operations that is capable of simultaneously planning for multiple parts and that identifies shared or composite setup plans for performing bending operations on a wide variety of different parts.

Another object of the present invention is to provide a multi-part setup planning technique that reduces the total number of setups and increases the overall through-put at a sheet metal bending facility.

Still another object of the invention is to provide an apparatus and method for multi-part setup planning to perform sheet metal bending operations, wherein the commonality of machine setups are identified in order to eliminate the use of extra tooling and fixturing, and to identify parts that can share resources.

Yet another object of the present invention is to provide a multi-part setup planning technique for performing sheet metal bending operations in which a family of parts is identified and a composite setup plan is determined that can be utilized for every part in the part family.

In view of the foregoing, according to an aspect of the present invention, a setup planning technique is provided in which a family of parts to be manufactured are identified and the setup constraints imposed by the various bending operations in the part family are determined. The setup constraints may define or describe spatial constraints on the sizes and locations of various tooling stages in the setup. After identifying setup constraints, setup plans are generated that satisfy all setup constraints. Any setup plan that satisfies all setup constraints may then be utilized to accommodate every part in the part family. Constraint propagation techniques may be utilized to identify compatible setup constraints and create setup plans. According to the various features and aspects of the present invention, dissimilar sheet metal parts can share setups, and the need for extra tooling and fixturing may be minimized. Further, the present invention provides significant improvements over the state-of-the-art systems and increases production capability and overall system through-put.

Accordingly, in accordance with an aspect of the invention, a method for multi-part setup planning is provided for operations to be performed by a bending workstation on a plurality of sheet metal parts in accordance with a composite setup plan. The setup planning method of the invention may include: identifying setup constraints for operations to be performed on each of the plurality of parts; determining, in accordance with the setup constraints that are identified, operations to be performed on the parts that have compatible setup constraints; and assigning operations that are determined to have compatible constraints to corresponding tooling stages of the bending workstation to develop a composite setup plan for the plurality of parts.

The multi-part setup planning method may also include identifying a set of operations that have compatible setup constraints by locating tooling stages that can accommodate each operation within the set of operations. Each of the setup constraints may comprise a set of setup constraint parameters, wherein the setup constraint parameters define setup constraints relating to the positioning of the parts in the workstation to perform the operations. Further, the setup constraint parameters for each part may include tooling parameters, and at least one of the tooling parameters may be defined according to a minimum tooling stage length for each operation that is given by the following:

$$L\text{–tolerance,}$$

where "L" is a length of a bend line of the part, and "tolerance" is a predetermined tolerance amount. The minimum allowed tooling stage length should be slightly smaller than the bend length, with a predetermined tolerance (e.g., 2 mm). Reducing the tooling stage length by more than the predetermined tolerance may result in poor bend quality.

In addition, at least one of the tooling parameters may also be defined according to a maximum allowed tooling stage length for each operation that is given by the following:

$$Gr+Gl+L-clearance,$$

where "Gr" is a gap length on a right side of a bend position of the part, "Gl" is a gap length on a left side of the bend position of the part, "L" is a length of a bend line at the bend position the part, and "clearance" is a predetermined clearance amount. The maximum allowed tooling stage length should be slightly smaller than the overall gap around the bend, with a predetermined clearance (e.g., 2 mm). The actual setting of the clearance amount may depend upon the accuracy of the part placement with respect to the tools of the press brake.

According to another aspect of the present invention, a multi-part setup planning system is provided for generating a composite setup plan for operations to be performed by a bending workstation on a plurality of sheet metal parts. The setup planning system of the invention may comprise: means for identifying setup constraints for operations to be performed on each of the plurality of parts; means for determining, in accordance with the setup constraints that are identified by the identifying means, operations to be performed on the parts that have compatible setup constraints; and means for assigning operations that are determined to have compatible constraints to corresponding tooling stages of the bending workstation to thereby develop a composite setup plan for the plurality of parts.

In the multi-part setup planning system, the determining means may include means for identifying a set of the operations that have compatible setup constraints by locating tooling stages that can accommodate each operation within the set of operations. Further, each of the setup constraints may include a set of setup constraint parameters, wherein the setup constraint parameters define setup constraints relating to the positioning of the part in the workstation to perform the bending operations.

By way of non-limiting example, the setup constraint parameters of each part may comprise the following: a gap length "Gr" on a right side of a bend position of the part, which denotes the distance by which a tooling stage can be extended towards the right side of the bend position; a gap length "Gl" on a left side of the bend position of the part, which denotes the distance by which a tooling stage can be extended towards the left side of the bend; an obstruction length "Or" on the right side of the bend position, which denotes a space in which no tooling is allowed on the right side of the bend position; an obstruction length "Ol" on the left side of the bend position; which denotes a space in which no tooling is allowed on the left side of the bend position; a safety distance "Sr" on the right side of the bend position, which denotes a minimum distance between the bend position and a next tooling stage towards the right side of the bend position; and a safety distance "Sl" on the left side of the bend position, which denotes a minimum distance between the bend position and a next tooling stage towards the left side of the bend position.

Further, according to an aspect of the invention, setup constraints may be identified in accordance with one or more of the following:

$$(Gr+Gl+L-clearance) \geq S \geq (L-tolerance),$$

$$Gl-0.5(clearance) \geq P,$$

$$Gr-0.5(clearance) \geq (S-P-L),$$

$$Sr \geq (S-P-L+Dr), \text{ and}$$

$$Sl \geq (P+Dl),$$

where "Dl" is a distance between a present tooling stage and a left adjacent tooling stage, "Dr" is a distance between the present tooling stage and a right adjacent tooling stage, "L" is the length of a bend line at the bend position of the part, "S" is a length of the present tooling stage, and "P" is a relative position of the bend line with respect to a left edge of the present tooling stage.

In the multi-part setup planning system of the invention, the means for identifying setup constraints may include means for determining each of the setup constraints based on an intermediate shape of the part and a configuration of the tooling of the bending workstation for each operation. Further, the means for determining setup constraints may include means for providing a geometric model of the intermediate shape of the part and the configuration of the tooling, and means for calculating part-tool intersection regions to determine setup constraint parameters for each operation. In addition, the multi-part setup planning system may further comprise means for determining a tooling stage arrangement for the bending workstation, wherein the stage arrangement determining means comprises means for identifying required tooling stages of the composite setup plan and means for generating an arrangement of the required tooling stages in the bending workstation to minimize a transfer frequency of the parts between the tooling stages.

According to another embodiment of the invention, a method is provided for setup planning for operations to be performed by a workstation in accordance with a shared setup plan. The setup planning method may include: defining a family of parts; identifying setup constraints imposed by operations to be performed on each part of the family of parts; and generating a shared setup plan that satisfies all of the setup constraints that are identified for the family of parts.

In accordance with the setup planning method, the act of generating may comprise: determining, in accordance with the setup constraints that are identified, operations to be performed on the parts that have compatible setup constraints; and assigning operations that are determined to have compatible constraints to corresponding tooling stages of the workstation to develop the shared setup plan for the family of parts. Further, the act of determining may include identifying a set of the operations that have compatible setup constraints by locating tooling stages that can accommodate each operation within the set of operations. In addition, each of the setup constraints comprise a set of setup constraint parameters, wherein the setup constraint parameters define setup constraints relating to the positioning of the part in the workstation to perform said operations.

Further, in the setup planning method of the invention, the act of identifying may include determining each of the setup constraints based on an intermediate shape of the part and a configuration of the tooling of the workstation for each operation. In addition, the act of determining may include providing a geometric model of the intermediate shape of the part and the configuration of the tooling, and calculating part-tool intersection regions to determine setup constraint parameters for each operation.

According to still another embodiment of the invention, a setup planning system is provided for generating a shared setup plan for operations to be performed by a workstation. The setup planning system may comprise: means for defining a family of parts; means for identifying setup constraints imposed by operations to be performed on each part of the family of parts; and means for generating a shared setup plan that satisfies all of the setup constraints that are identified for the family of parts.

In the setup planning system, the generating means may comprise: means for determining, in accordance with the setup constraints that are identified, operations to be performed on the parts that have compatible setup constraints; and means for assigning operations that are determined to have compatible constraints to corresponding tooling stages of the workstation to develop the shared setup plan for the family of parts. Further, the determining means may include means for identifying a set of the operations that have compatible setup constraints by locating tooling stages that can accommodate each operation within the set of operations. In addition, each of the setup constraints may include a set of setup constraint parameters, wherein the setup constraint parameters define setup constraints relating to the positioning of the part in the workstation to perform the operations.

The present invention also encompass a method for multi-part setup planning for bending operations to be performed by a workstation on a plurality of sheet metal parts in accordance with a composite setup plan. In accordance with the invention, the method may comprise: defining a list O of operations to be performed on the plurality of parts; and repeating the following until the list O is empty: determining the most constraining operation o in the list O; identifying a set of operations c(o) in the list O which have compatible constraints with the most constraining operation o; defining a set of stages for the composite setup plan that satisfies the constraints for the most constraining operation o and the set of operations c(o); assigning the most constraining operation o and the set of operations c(o) to the set of stages of the composite setup plan; and removing the most constraining operation o and the set of operations c(o) from the list O. The most constraining bending operation o may be determined according to different techniques. For example, the collinear bend operation with the maximum interruption index in the list O may be located and identified as the most constraining bending operation. If there are no collinear bending operations, then the bending operation in the list O with the maximum length (e.g., based on the length of the bend line) may be located and identified as the most constraining bending operation.

As such, according to the multi-part setup planning method, the act of determining may comprise locating in the list O of operations a bending operation with a maximum bend line length, and assigning the bending operation with the maximum bend line length as the most constraining operation o in the list O. In addition, the act of determining may comprise locating in the list O of operations a collinear bending operation with a maximum interruption index, and assigning the collinear bending operation with the maximum interruption index as the most constraining operation o in the list O.

In addition, the act of identifying compatible constraints may include determining setup constraints for each operation in the list O of operations. Each of the setup constraints may comprise a set of setup constraint parameters that define setup constraints relating to the positioning of a part in the workstation to perform the bending operations. Further, operations with compatible constraints may be identified by locating tooling stages that can accomodate each of the operations.

According to another aspect of the invention, the act of identifying operations with compatible constraints may comprise determining that an operation i and an operation j are compatible when there exists a range of relative positions which satisfy the following:

$$XL_{j,i} \leq X_j31\ X_i \leq XR_{j,i}$$

where "$X_i$" is a reference position of operation i, "$X_j$" is a reference position of operation j, "$XL_{j,i}$" is a leftmost position of operation j with respect to operation i, and "$XR_{j,i}$" is a rightmost position of operation j with respect to operation i. Further, the act of identifying operations with compatible constraints may comprise determining that a plurality of operations n are compatible when there exists a vector $\{X_1, X_2, \ldots, X_n\}$ which satisfies the following for every pair of operations i,j (where i does not equal j) of the plurality of bending operations n:

$$X_j - X_i \leq XR_{j,i}$$

$$X_j - X_i \leq -XL_{j,i}$$

where "$X_i$" is a reference position of operation i, "$X_j$" is a reference position of operation j, "$XL_{j,i}$" is a leftmost position of operation j with respect to operation i, and "$XR_{j,i}$" is a rightmost position of operation j with respect to operation i.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein:

FIGS. 3A, 3B, 3C and 3D graphically represent various operations that may be performed when bending a sheet metal workpiece with a set of punch and die tools of a press brake;

DETAILED DESCRIPTION OF THE PREFERRED EMBODIMENTS

Figure 1A:
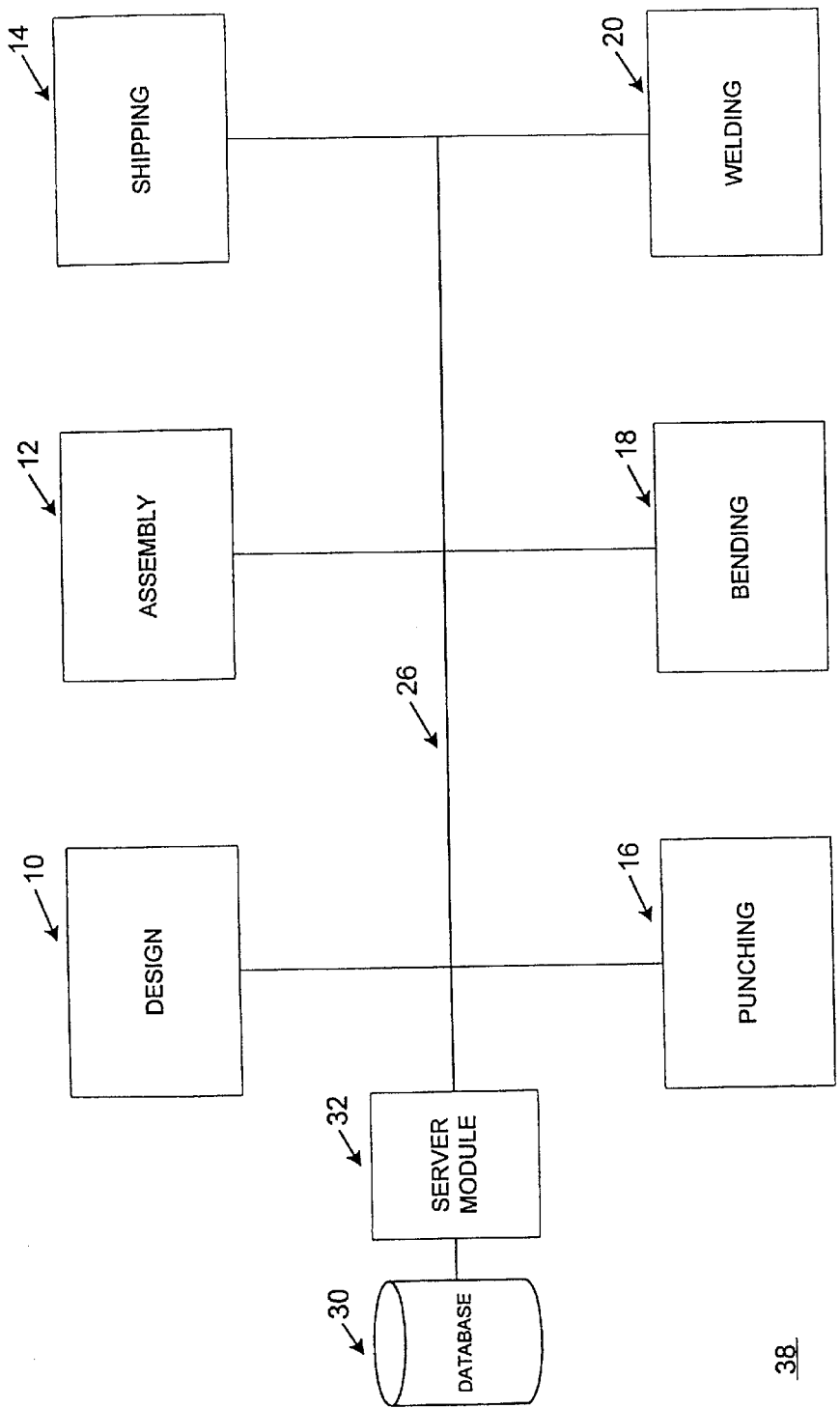
FIG. 1A illustrates, in block diagram form, an exemplary architecture of a sheet metal manufacturing facility by which the various features and aspects of the present invention may be implemented.

According to an aspect of the invention, an apparatus and method are provided for single or multi-part setup planning to facilitate the production of parts, such as sheet metal parts, and to increase the overall through-put of a manufacturing or production facility. The various features and aspects of the present invention may be utilized in a wide variety of environments and settings. For example, the invention may be implemented in manufacturing facilities which include bending workstations that perform sheet metal bending operations to produce sheet metal parts. Such workstations may include press brake equipment that is controlled manually or include robotic or automated machinery to facilitate handling and bending of sheet metal workpieces by the press brake equipment. The present invention may also be implemented as part of an integrated or stand-alone expert planning system. Such a system may be provided at a bending workstation of the manufacturing facility, or may be integrated with a CAD or CAD/CAM system. The features of the invention may also be fully automated to provide expert planning information, including machine setup information for performing operations on each part, or may be implemented as part of an interactive system that permits manual input from an operator to generate expert planning information.

Further, although the present invention is described herein with reference to the use of press brake equipment and the determination of tool stage length constraints for sheet metal bending operations, the features and aspects of the invention may be applied to a wide variety of process planning tasks in different application domains. For instance, the features of the present invention may also be utilized to solve one-dimensional resource constraints, such as tool height or length constraints, for milling, punching, drilling, welding and other types of part production applications. Further, the invention may be adapted to solve other types of resource constraints, such as gripper constraints for robot grasping operations to be performed on a part. Moreover, the present invention may be applied to facilitate the production of a wide variety of part types, such as metal, wood, plastic and composite parts, and should not be construed to be limited to the production of sheet metal parts.

According to the features of the present invention, a setup planning technique is provided in which a family of parts to be manufactured is identified. The family of parts may comprise a plurality of parts or a single part requiring multiple operations. After the family of parts is identified, the setup constraints imposed by the various operations in the part family are determined. By way of a non-limiting example, the setup constraints may define or describe spatial constraints on the sizes and locations of various tooling stages in the setup. After identifying setup constraints, setup plans are generated that satisfy all setup constraints. Any setup plan that satisfies all setup constraints may then be utilized to accommodate each part in the part family. According to an aspect of the invention, constraint propagation techniques may be utilized to identify compatible setup constraints and create setup plans. In addition, through the various features of the invention, a composite setup plan may be generated so that dissimilar sheet metal parts can share setups and, as a result, the need for extra tooling and fixturing may be minimized.

As noted above, the features of the invention may be utilized by manufacturing facilities which include bending workstations for performing bending operations on sheet metal workpieces. These sheet metal manufacturing facilities may take the form of a wide variety of factory environments and setups. For instance, FIG. 1A illustrates an exemplary progressive sheet metal manufacturing facility 38 in which the features of the present invention may be implemented.

In FIG. 1A, a progressive sheet metal manufacturing facility 38 is generally illustrated in block diagram form. As illustrated in FIG. 1A, the sheet metal manufacturing facility or factory 38 includes a plurality of locations 10, 12, 14 . . . 20 that are dispersed throughout the factory. These locations may comprise a design office 10, an assembly station 12, a shipping station 14, a punching station 16, a bending station 18 and a welding station 20. Although the sheet metal factory 38 in FIG. 1A is depicted as having only six discrete locations, the factory may include more than six discrete locations, and may also include more than one location for each type of office or station illustrated in FIG. 1A. For example, depending upon the size and production capacity requirements for the facility 38, more than one punching station 16, bending station 18 and/or welding station 20 may be provided. In addition, the factory 38 may include more than one design office 10, assembly station 12 or shipping station 14, and may also include other types of locations for facilitating the production and manufacturing of components, such as bent sheet metal components.

Each of the locations 10, 12, 14 . . . 20 within the factory 38 may be adapted to include equipment to execute one or more of the discrete production and manufacturing stages or processes associated with the production and manufacturing of the components. For example, the design office 10 may include an appropriate CAD/CAM system, to facilitate development of the sheet metal part design based on the customer's specification. The CAD/CAM system may comprise one or more personal computers, a display unit, a printer and commercially available CAD/CAM software. With the CAD/CAM software, the design programmer may develop a 2-D model and/or 3-D model of the sheet metal part based on the drawings and data provided in the customer's order. The design programmer may also generate control code based on the sheet metal part design in order to generate a part program to control, for example, a CNC punch press and/or cutting machinery to punch or cut the sheet metal component from stock material.

Punching station 16 and bending station 18 may each be provided with any combination of CNC and/or NC based machine tools. For example, punching station 16 may include one or more CNC and/or NC punches, such as COMA series and/or PEGA series Amada turret punch presses or other commercially available CNC and/or NC punch presses. Further, bending station 18 may include one or more CNC and/or NC press brakes, such as RG series Amada press brakes or other commercially available multiple-access, gauging press brakes. Fully automated or robot assisted machinery, such as the Amada CELLROBO MINI and the Amada PROMECAM, may also be provided at there locations. Further, for workstations to be equipped with robots, the Amada BM100 robot workstation may be utilized.

In addition, welding station 20 may be provided with appropriate welding machinery in order to effectuate any required welding of the sheet metal component. Each punching station 16, bending station 18 and welding station 20 may be located at various areas on the factory floor of the facility 38, and also may include machinery that is operated by skilled operators (e.g., punch press operators, bending operators, etc.). The required punching and bending operations, in any necessary welding operations, may be performed at these locations during the production process. These operations may be performed by a human operator, and/or by robot assisted machinery based on the needs of the factory and the level of automation that is required and/or provided.

As further shown in FIG. 1A, the sheet metal facility 38 may also include an assembly station 12 and a shipping station 14. Assembly station 12 and shipping station 14 may include the necessary packaging, routing and/or transportation equipment to facilitate the assembly and shipping of the manufacturing components to the customer. The assembly and shipping of the components may be performed or controlled manually by factory personnel or may be machine automated and/or machine assisted. In addition, assembly station 12 and shipping station 14 may be physically located near the factory floor (e.g, in close proximity to punching station 16, bending station 18, and/or welding station 20) or within a separate facility or area of the sheet metal factory 38.

In accordance with an aspect of the present invention, an expert sheet metal planning and bending system (not shown in FIG. 1A) may be provided and implemented at a server module 32 of the facility 38. Such as expert system may include one or more expert modules or planners for generating and executing a bending plan for producing, for example, bent sheet metal components. These expert modules may include expert systems or subsystems for determining an optimum bend sequence and tooling requirements (including tool selection and tool stage layout) for the bending plan. In addition, for robot-based workstations, robot handling and motion experts or planners may be provided for determining the robot motion paths and holding steps for executing the bending plan. A repositioning expert may also be provided for determining the sequences and operations associated with controlling a repositioning gripper and repositioning operations of the robot. Such an expert system may incorporate, for example, the various features and aspects described in U.S. patent application Ser. Nos. 08/386,369 and 08/338,115. A more detailed discussion of an exemplary expert planning system that may be provided according to the various aspects of the present invention is provided below.

In addition to the provisioning of an expert system in the server module 32, an intelligent manufacturing system (not shown in FIG. 1A) may also be integrated or provided with the expert sheet metal planning and bending system of the present invention. Such an intelligent manufacturing system may be implemented at server module 32 and may be adapted to manage and distribute design and manufacturing information throughout the facility or factory 38. Various features may be provided with the intelligent manufacturing system, including the ability to search and retrieve previous job information from a central database, such as database 30, so that previous job information (which may include design and manufacturing information of previously produced parts) may be used when generating a plan for developing a new part that has the same or similar features to that of a previously produced part. Further, the intelligent manufacturing system may also provide various graphical user interfaces in order to facilitate analysis of the bending plan by a machine or bending operator. By way of a non-limiting example, the various features disclosed in U.S. patent application Ser. No. 08/690,084, filed on Jul. 31, 1996, entitled "Apparatus And Method For Managing And Distributing Design And Manufacturing Information Throughout A Sheet Metal Production Facility," in the names of K. HAZAMA et al., and U.S. Provisional Application Ser. No. 60/016,958, filed on May 6, 1996, entitled "Apparatus And Method For Managing And Distributing Design And Manufacturing Information Throughout A Sheet Metal Production Facility," in the names of K. HAZAMA et al., the contents of which are expressly incorporated herein by reference in their entireties, may be used and implemented in the intelligent manufacturing system.

The various features and applications of server module 32, including, for example, the features of an expert sheet metal planning and bending system and the features of an intelligent manufacturing system, may be accessed from any station 10, 12, 14 . . . 20 within the facility 38. By sending query requests or messages and information to server module 32, stations 10, 12, 14... 20 may access the various expert modules to receive bending plan information, including, for example, bend sequence and tooling information for producing a particular part.

For these purposes, a communications network 26 may be provided that interconnects server module 32 and database 30 to each of the plurality of locations 10, 12, 14 . . . 20 within the sheet metal facility 38. Each of the locations 10, 12, 14 . . . 20 may include station modules (not shown) that interface with communications network 26 and database 30. Communications network 26 may comprise any network or combination of networks capable of transmitting data and information to and from the locations 10, 12, 14 . . . 20 and the server module 32 and database 30. Such transmission may be achieved, for example, electronically, optically, by RF transmission and/or by infrared transmission. By way of a non-limiting example, communication network 26 may be implemented by a Local Area Network (LAN), Ethernet and/or an equivalent network structure. In addition, communications network 26 may be implemented as an Intranet and/or through the use of the Internet. Information and query messages may be sent across communications network 26 in accordance with any one of a variety of transmission protocols, including (but not limited to ) Transmission Control Protocol/Internet Protocol (TCP/IP). Each of the locations 10, 12, 14 . . . 20 may also include station modules (not shown) having network terminating equipment (such as a computer, minicomputer or workstation) and/or peripheral devices (such as a display monitor or screen, printers, CD-ROMs, and/or modems) to transmit and receive information over communications network 26. The network terminating equipment and peripheral devices may include hardware and appropriate software or programmed logic for interfacing with communications network 26. If a computer is provided at one of the factory locations, the computer may be a stand-alone, personal computer, or a general purpose computer that is part of an interface device of the equipment or machine provided at the location. For example, the computer may be an IBM compatible or Macintosh personal computer, or may be a computer that is part of an interface/control system of the machinery, such as an Amada AMNC system.

As shown in the exemplary architecture of FIG. 1A, database 30 and server module 32 may be connected to communications network 26. Server module 32 may comprise network terminating equipment (not shown) such as the personal computer, minicomputer or main frame, with suitable hardware and software for interfacing with communications network 26. Server module 32 may also include software or firmware for implementing the various features of the invention, such as those of the tooling expert/planner and other aspects of the invention described in greater detail hereinafter. In addition, database 30 may be provided with server module 32 for storing appropriate design and manufacturing information associated with each customer's order, as well as other part and bending plan information. By way of non-limiting example, database 30 may be implemented by any commercially available database with sufficient memory capacity for storing design and manufacturing information of the factories, and the identity of customers, and for storing other data, tables and/or programs. For instance, database 30 may comprise a SCSI memory disk with four (4) Gigabits or more of available memory space.

The design and manufacturing information that is stored in database 30 may be accessed and distributed to the various locations 10, 12, 14 . . . 20 within the sheet metal facility 38 via communications network 26. Various data formats, such as Structured Query Language (SQL), may be used for accessing and storing data to database 30. In addition, information that is stored in database 30 may be backed up or stored on a wide variety of storage medium, such as magnetic tape, optical disk or floppy disks. Server module 32 and database 30 may be connected to communications network 26 at a separate area or location within the factory, such as those shown in FIG. 1A, or at a location that is within or in close proximity to one of the predefined stations (e.g., within design office 10). Although the embodiment of FIG. 1A depicts database 30 as being part of server module 32 and interfacing with communications network 26 via the server module, database 30 may of course be physically located separately from server module 32 and connected to communication network 26 via a network database module, such as that shown in the alternative embodiment of FIG. 1B.

Figure 1B:
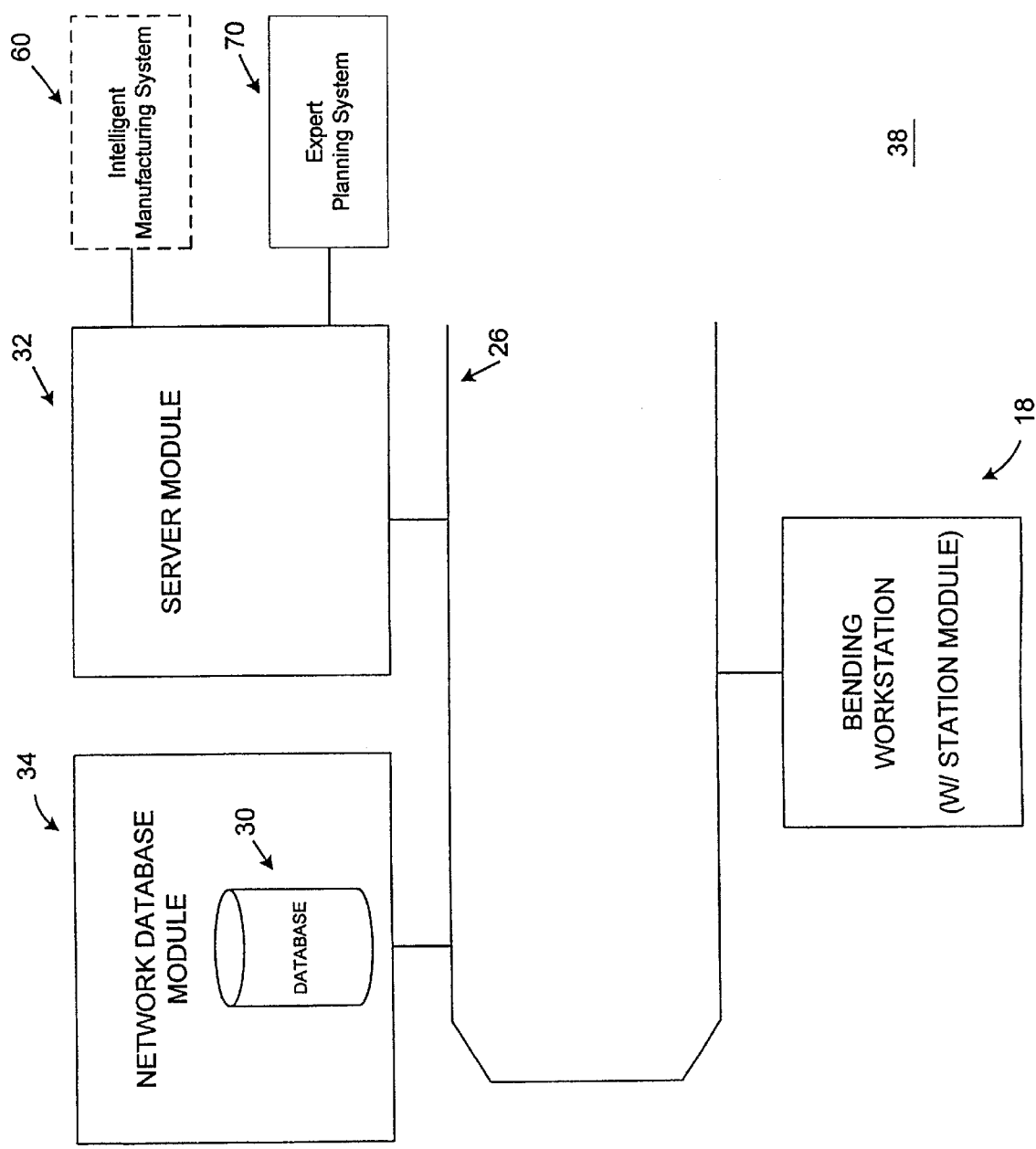
FIG. 1B illustrates, in accordance with another exemplary embodiment, an architecture of a sheet metal manufacturing facility in which the features of the invention may be provided.

In particular, FIG. 1B illustrates a sheet metal manufacturing facility 38 according to another aspect of the present invention. In the embodiment of FIG. 1B, database 30 and server module 32 are provided separately, with database 30 being connected to communications network 26 via a network database module 34. However, the invention is not limited to any particular network arrangement, and database 30 and server module 32 may be provided together, as shown, for example in FIG. 1A, with the functionality of the network database module 34 for providing access to the database being incorporated in the server module. Further, various database languages and management systems may be used for creating, maintaining and viewing information stored in database 30. Database languages such as Structured Query Language (SQL) may be used for defining, manipulating and controlling data in database 30. For example, an SQL server (which is a product that is commercially available from Microsoft Corporation) may be utilized to implement such features. In addition, an Open Database Connectivity (ODBC) compatible driver may be provided to facilitate access of information from database 30 over communications network 26.

As noted above, server module 32 may include various software-based applications for implementing an expert planning system (see, e.g., expert planning system 70 in FIG. 1B) and other systems, such as an intelligent manufacturing system (intelligent manufacturing system 60 in FIG. 1B). An interface module or application (not shown) may be provided at server module 32 for facilitating the transfer of messages and information between the various applications, and between the station modules and the server module. The interface application may be a separate module/application, or may be integrated (e.g., as one or more submodules) within the applications of the server module 32. In this regard, it is noted that the various features and aspects disclosed in U.S. patent application Ser. No. 08/706, 830, filed on Sep. 3, 1996, entitled "Apparatus And Method For Integrating Intelligent Manufacturing System With Expert Sheet Metal Planning And Bending System," in the names of K. HAZAMA et al., the content of which is expressly incorporated herein by reference in its entirety, may be implemented to facilitate such integration and utilization of each application of server module 32.

Each of the applications of server module 32 may be implemented through software and may be executable on a computer-based platform at server module 32. Server module 32 may include, for example, operating system software, such as Windows NT, that permits multi-tasking and multi-processing of simultaneous running applications. In addition, the various applications may be developed using a high level programming language, such as C++, and programming techniques such as object oriented programming techniques. In addition, executable client applications may be provided at each of the station modules of locations 10, 12, 14 . . . 20 to perform various operations relating to the expert planning system and other applications of server module 32. As further discussed below, the expert planning system 70 of server module 32 may include a tooling planner or expert which may be utilized for multi-part setup planning. The various aspects of the tooling planner are discussed in greater detail below, in accordance with the features of the present invention.

The present invention provides an expert planning system which includes a tooling planner module which performs operations planning for sheet metal bending operations to be performed by, for example, a bending workstation 18 of the facility 38. The expert planning system utilizes a multi-part setup planning technique for minimizing overall production time and cost. In accordance with an aspect of the present invention, the expert planning system selects tools for various bending operations and finds the tooling-imposed ordering constraints on various bending operations. This may be performed by determining the most likely shape of the workpiece for various bending operations and selecting the minimum tool set (i.e., having the minimum number of tool types) that works for these intermediate workpiece shapes. In addition, a state space search may be performed. During this search, various operation sequences are analyzed and the tooling planner may select the one which requires the least setup efforts. This may be performed by conducting setup planning for partial operation sequences. Partial operation sequences that result in better setups and appear promising may be examined first, resulting in improved computational efficiency. Among all the operation sequences examined during the state space search, the operation sequence resulting in the least setup effort may be selected and most favored by the tooling planner.

As noted above, the expert planning system and tooling planner of the present invention may be utilized for sheet metal bending operations planning. Such sheet metal bending operations may be performed by bending equipment provided at, for example, bending workstation 18. Such equipment may comprise press brake equipment provided with or without robotic manipulators. By way of a non-limiting example, FIG. 2 illustrates a portion of a press brake 140 of a sheet metal bending workstation and a robotic manipulator (robot) 160 that may be provided with the press brake 140.

Figure 2:
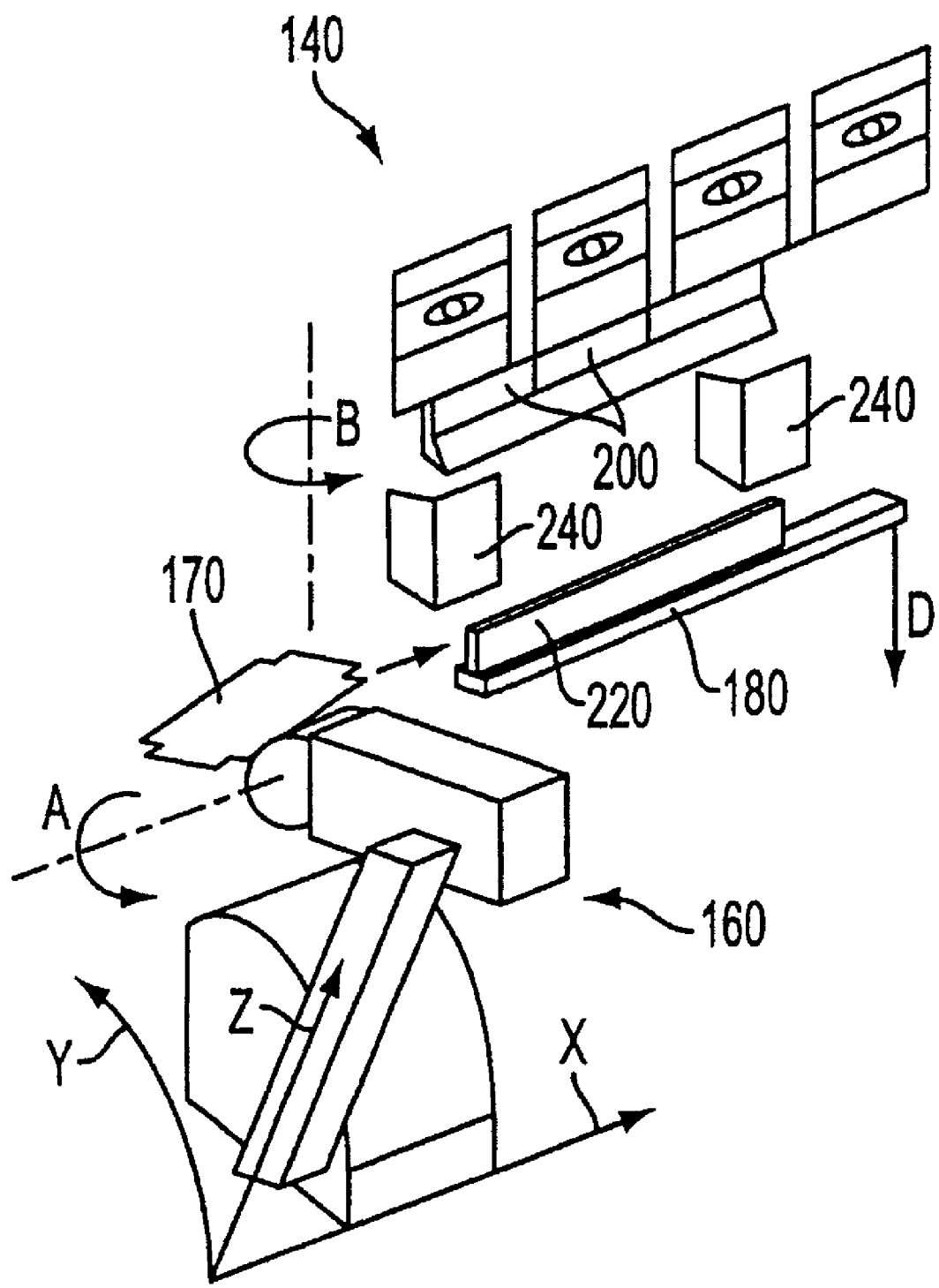
FIG. 2 depicts exemplary press brake equipment that may be provided at a bending workstation.

As shown in FIG. 2, press brake 140 includes several components, such as a die rail 180, at least one die 220, at least one punch tool 200, and a back gauging mechanism 240. During operation of press brake 140, a piece of sheet metal (i.e., a sheet metal workpiece) 170 is manipulated by robot 160 and placed in the die space formed between punch tool 200 and die 220. Thereafter, punch tool 200 is driven towards die rail 180 to cause punch tool 200 and die 220 to concurrently engage the sheet metal workpiece. The sheet metal workpiece 170 is then bent in conformance with the respective complementary operating surfaces of punch tool 200 and die 220. Back gauging mechanism 240 may be provided for positioning the workpiece in the press brake, and to ensure that the workpiece is properly spaced and aligned within the die space. The handling and positioning of the workpiece may be performed by robot 160, which may have a gripper that is rotatable about an axis A and that is movable along three different axes (e.g., X, Y, Z in FIG. 2).

FIGS. 3A–3D illustrate in greater detail the various operations that may be performed when bending a sheet metal workpiece 170 with the punch and die tools 200, 220 of a press brake. As discussed above, when performing a sheet metal bending operation, a flat sheet metal workpiece is bent using a set of complimentary punch and die tools. These tools are mounted on a press brake, such as that shown in FIG. 2, which controls the relative motion between the punch and die, and provides the necessary bending pressure to bend the workpiece. FIGS. 3A–3D illustrate the basic steps of a sheet-metal bending operation. Typically, a flat workpiece 170 is to be bent along a bend line 190 (illustrated by the dashed line in FIG. 3A) to form the appropriate intermediate or final part. Initially, the flat sheet metal workpiece 170 is positioned on the die 220, as illustrated in FIG. 3A. Such positioning of the workpiece 170 may be performed manually by a bending operator or through the assistance of a robotic manipulator, such as that illustrated in FIG. 2. Further, back gauge mechanisms, such as mechanisms 240 in FIG. 2, may be provided to facilitate positioning of the workpiece 170 between the space formed between the die 220 and punch 200. Thereafter, the punch 200 may be positioned on the sheet metal part 170, as illustrated in FIG. 3B, by bringing the punch 200 and die 220 toward each other. Bending of the workpiece 170 may then be performed, as shown in FIG. 3C, by applying the appropriate bending pressure and further bringing the complementary surfaces of the punch 200 and the die 220 toward each other. After the bend along the bend line 190 has been performed, the workpiece 170 may be removed from the press brake by separating the punch 200 and the die 220 from one another, as illustrated in FIG. 3D.

Figure 4A:
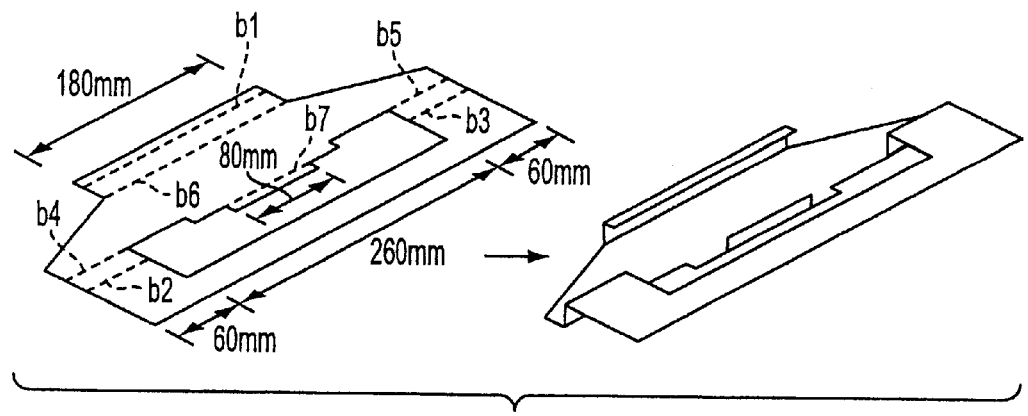
FIGS. 4A, 4B and 4C illustrate exemplary sheet metal parts (Part 1, Part 2, and Part 3, respectively), including their respective starting flat part and final bend part.
Figure 4B:
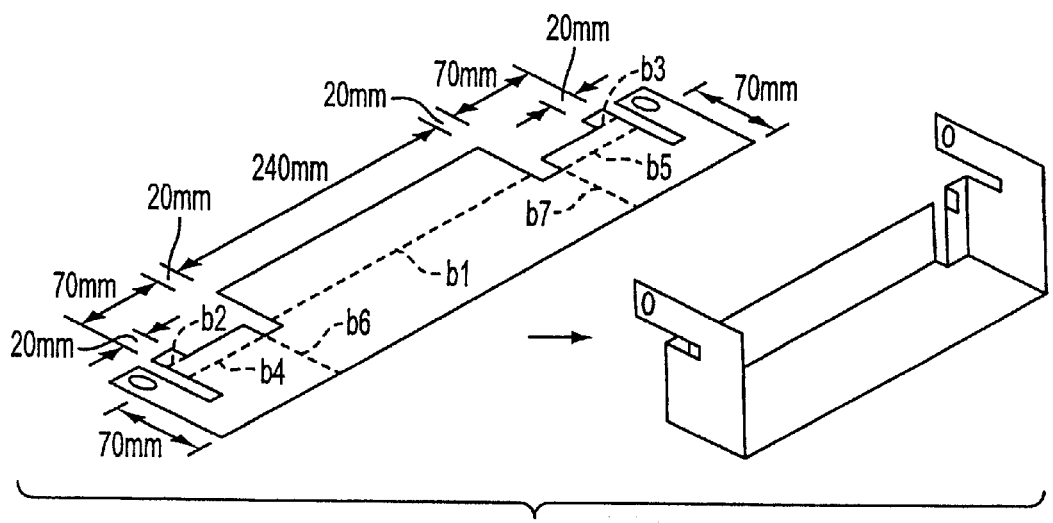
Figure 4C:
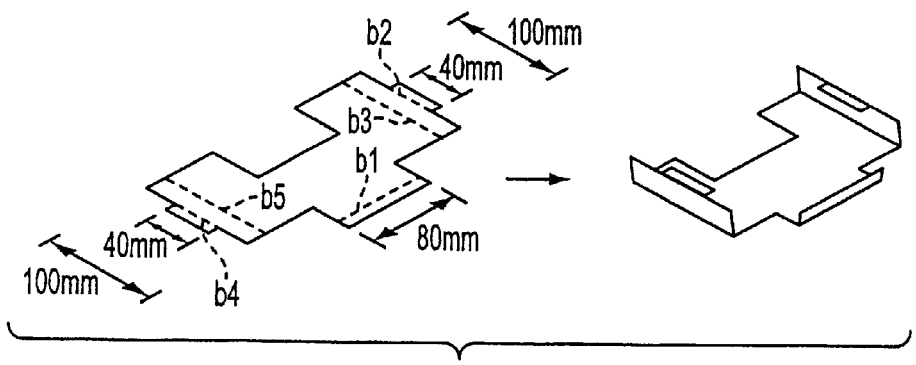
Figure 5A:
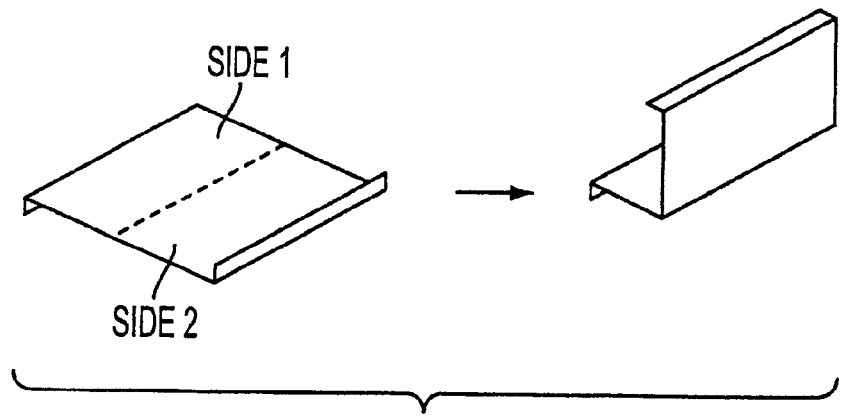
FIGS. 5A, 5B and 5C illustrate an exemplary workpiece with two sides defined by a bend line, and the different possibilities for orienting and performing a bending operation on the workpiece.
Figure 5B:
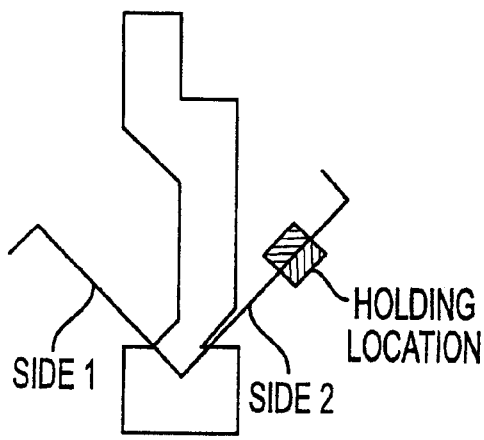
Figure 5C:
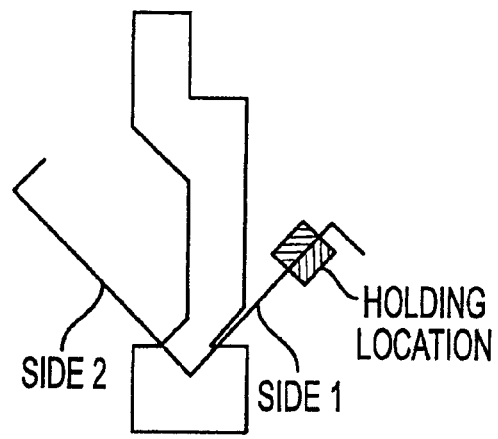

FIGS. 4A–4C illustrate exemplary sheet metal parts (referred hereinafter to as Part 1, Part 2, and Part 3, respectively), including their respective starting flat part and final bent part. In each of the examples of FIGS. 4A, 4B and 4C, the bend lines $b_1$–$b_n$ are indicated by dash lines in the starting flat part and, for purposes of illustration, the various dimensions of each of the parts is also represented. When performing a bending operation on any of the bend lines of the part, it is possible to perform such an operation in one of two different ways. That is, each bend line connects two faces, and any one of these two faces can be kept outside of the press brake, resulting in two different possibilities for orienting the part in the press brake. For example, a bend line may define two sides of a workpiece, as illustrated in FIG. 5A, which results in two different possibilities for orienting and performing the bending operation, as illustrated in FIGS. 5B and 5C, respectively. Many times the intermediate workpiece geometry is such that only one of these choices will work without interfering with the components of the press brake. Therefore, when specifying a bending operation, both the bend line and the part orientation should be specified.

When considering setup planning, many factors and constraints should be considered. For example, the bending or operation sequence, the tooling stages, the setup constraints, the existence of collinear bends, the press brake setups and the setup plans should be considered and determined. A bending or operation sequence generally relates to the order in which the bend lines of a part are to be bent. An ordered set of bending operations may be defined for each workpiece part. The bending sequence may be designated or determined by a bending operator, or may be generated automatically by, for example, an expert planning system. For example, for the exemplary Part 1 of FIG. 4A, the operation sequence for the part could be as follows: [(b7)(b2,b3)(b4, b5)(b1)(b6)]. That is, bend line b7 is bent in the first bending step, then bend lines b2,b3, then bend lines b4,b5, then bend line b1, and then finally bend line b6. As indicated by the operation sequence for Part 1 of FIG. 4A, a bending step can include more than one bend line. Further, whenever a bending step includes more than one bend line, all bend lines in that operation can be created simultaneously.

Tooling stages may be defined and setup for the press brake equipment. A tooling stage consists of a pair of punch and die tools (see, for example, FIG. 8). The length of punch and die stages are typically the same, although they do not necessarily need to be the same. However, bending punches and dies may be provided in a variety of length segments. These segments can be placed next to each other to create various tooling lengths. For example, a tooling stage of length 85 mm can be created by combining segments of sizes 50 mm, 20 mm and 15 mm.

Figure 6:
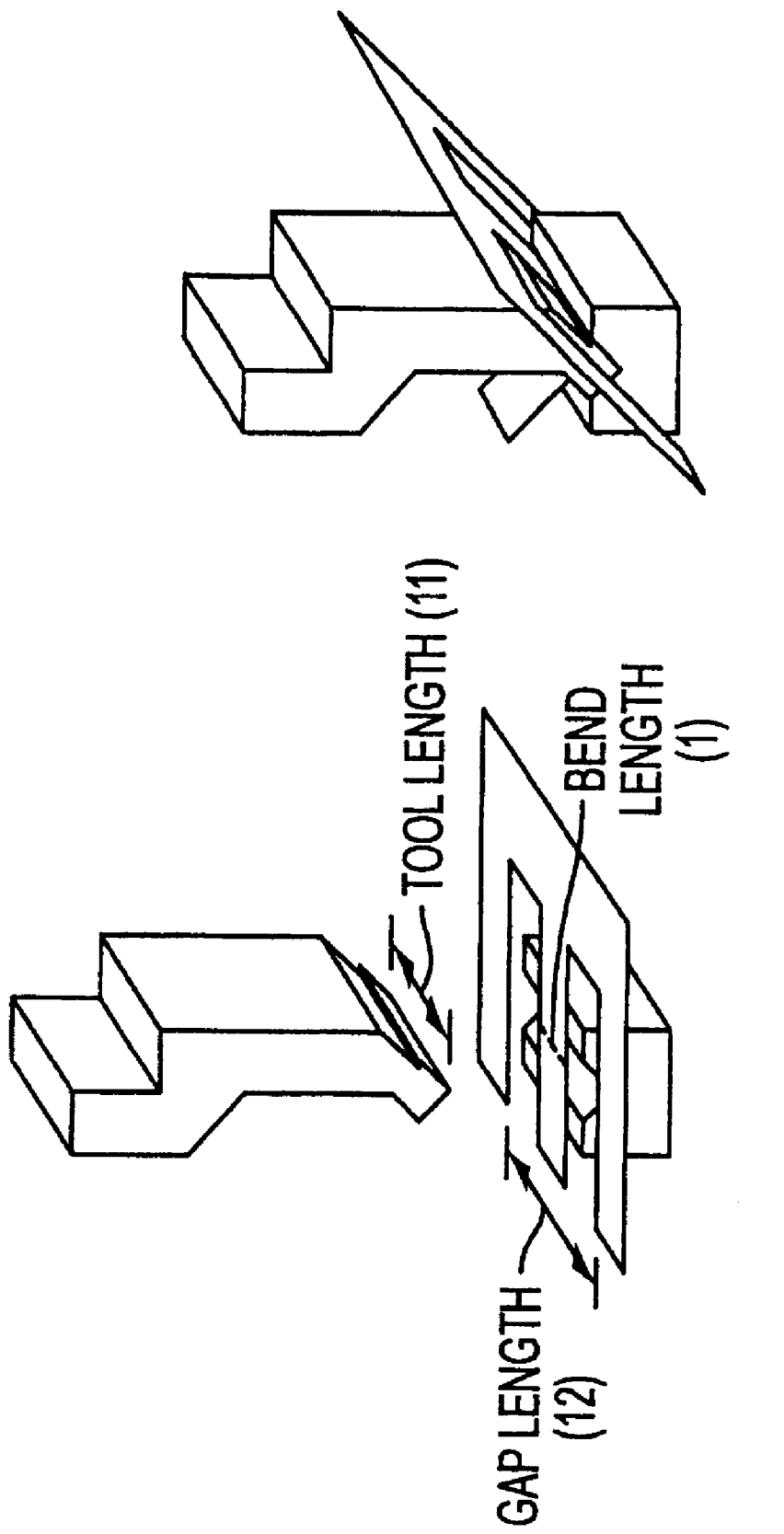
FIG. 6 graphically represents an example of a setup constraint for performing a bending operation on a sheet metal part.

As noted above, the intermediate shape of a workpiece part may impose restrictions on the tooling stage length that can be used to perform a bending operation. During each bending step or operation, interference between the intermediate part and the components of the press brake should be avoided, and sufficient clearance should be provided so that the sheet metal part may be appropriately formed. Setup constraints therefore define these restrictions for each workpiece. FIG. 6 illustrates an exemplary setup constraint for a bending operation, in which the tool length 11 cannot exceed the gap length 12 for the bending operation to be performed at the bend line defined by the bend length 1. Any tool bigger than the gap length 12 would result in interference between the die and the workpiece, as illustrated in FIG. 6.

Figure 7:
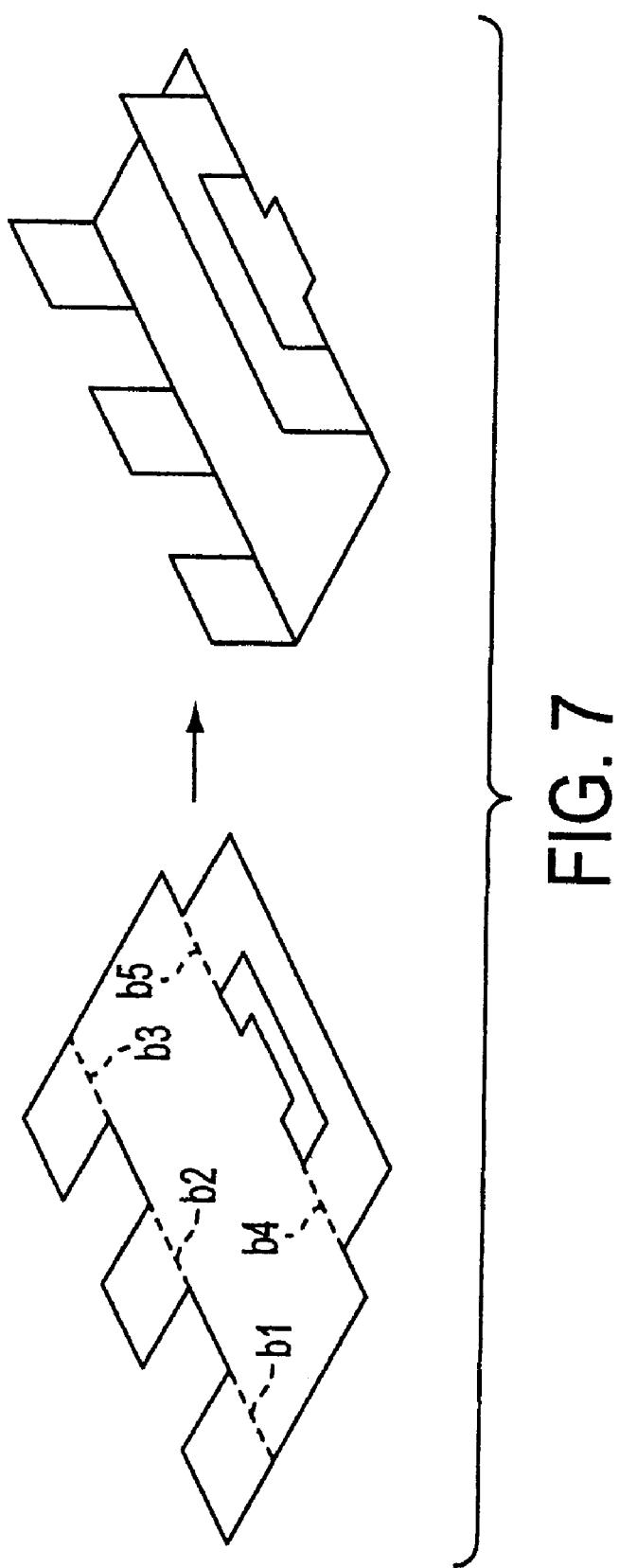
FIG. 7 illustrates collinear bends of an exemplary sheet metal part.

As noted above, any particular bending operation or step may include one or more bend lines. Such bend lines may include collinear bends, which are generally bending operations which have collinear bend lines separated by gaps or spaces. For example, FIG. 7 illustrates the starting flat part and final part of an exemplary workpiece having collinear bend lines. In the exemplary workpiece of FIG. 7, (b1, b2, b3) is, for example, a collinear bend, consisting of three collinear bend lines b1, b2 and b3. Two types of collinear bends may exist. The first type, commonly referred to as interrupted collinear bends, cannot be performed in a single tooling stage. Interrupted collinear bends require gaps among tooling stages. The second type of bend, however, which is commonly referred to as uninterrupted collinear bends, can be performed in a single tooling stage. In particular, in the exemplary workpiece of FIG. 7, (b1, b2, b3) is an uninterrupted collinear bend, and (b4, b5) is an interrupted collinear bend. The size of a collinear bend refers to the number of bend lines in the operation. Further, the interruption index of a collinear bend refers to the number of required gaps in tooling stages. For uninterrupted collinear bends, the interruption index is 0.

Figure 8:
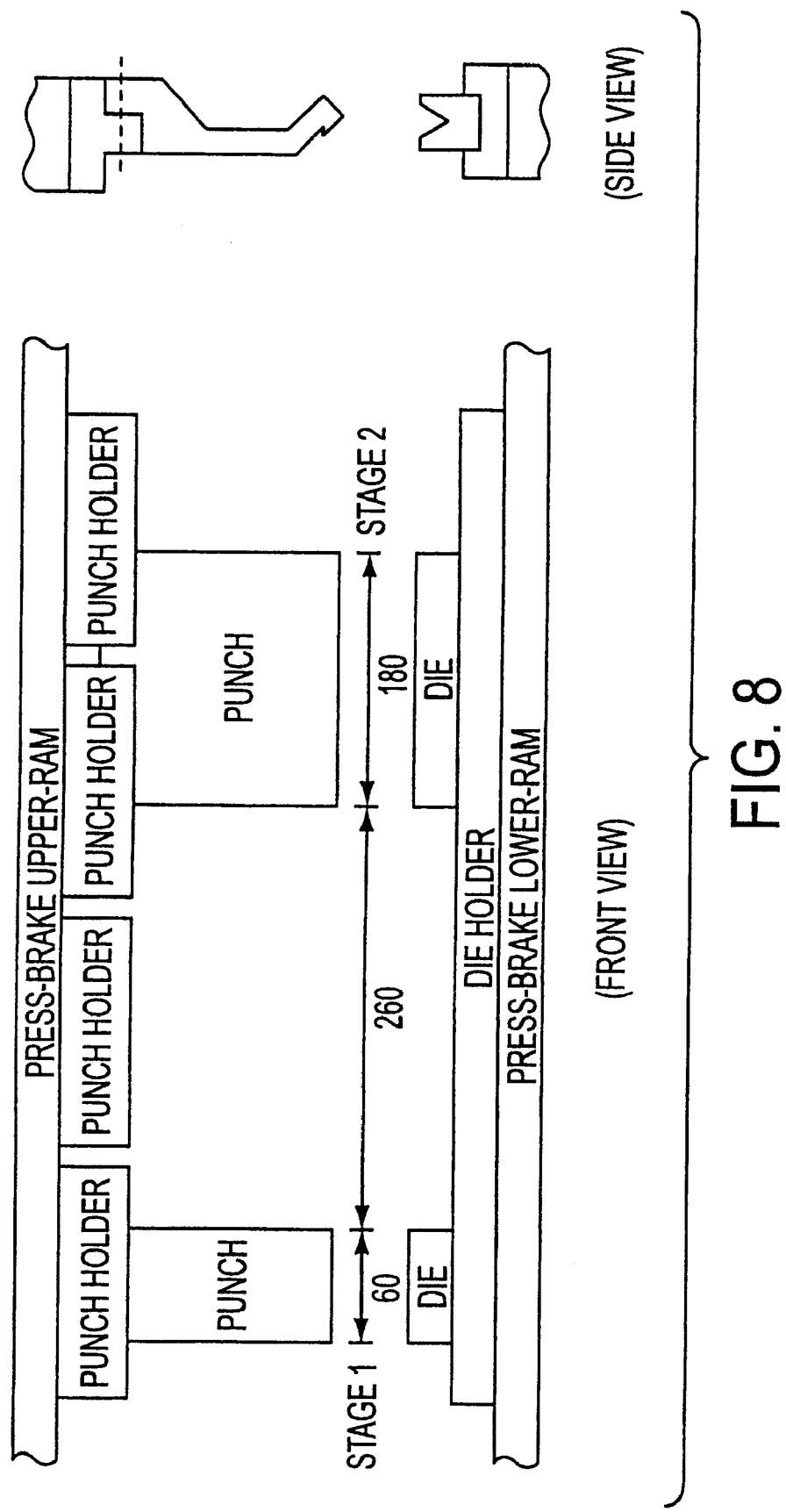
FIG. 8 graphically represents an exemplary bending press brake setup for the exemplary part shown in FIG. 4A.

FIG. 8 is a graphical representation of the front and side views of an exemplary press brake setup. The press brake setup describes or defines the arrangements of various tooling stages on the bending press brake, such as that which may be provided at bending workstation 18. The press brake can consist of one or more tooling stages. FIG. 8 illustrates a press brake setup for the operation sequence [(b7)(b2,b3)(b4,b5)(b1)(b6)] for the exemplary Part 1 shown in FIG. 4A. As shown in FIG. 8, two stages are provided (one of 60 mm in length and one of 180 mm in length) with a spacing of 260 mm therebetween. In order for a press brake setup to be feasible or valid, in accordance with the invention, the press brake setup should satisfy the following conditions: (i) there should be no unwanted interference between tooling stages and workpiece shapes during any bending operation, since such an interference may distort the workpiece and damage the tools of the press brake; and (ii) every tooling stage should fit inside the press brake, since each press brake has a predetermined finite tool holding space at which various stages can be installed. Accordingly, when determining the press brake setup, the total required length for various tooling stages should be less than the available tooling space on the press brake.

When performing operations planning, setup plans should be generated and defined. A setup plan describes the press-brake setup and the assignment of various bend lines to tooling stages in the setup. According to an aspect of the present invention, each assignment may be a triple designation in accordance with the following format: (B, T, P), where "B" is a bend line, "T" is a tooling stage, and "P" is the relative position of the bend line B with respect to the left edge of the tooling stage T. For purposes of illustration, Table 1 below represents a setup plan for the exemplary Part 1 of FIG. 4A and the press brake setup shown in FIG. 8.

TABLE 1

| Setup Plan for Part 1 of FIG. 4A | | |
|---|---|---|
| B | T | P |
| b7 | stage 2 | 50 |
| b2 | stage 2 | 0 |
| b3 | stage 1 | 0 |
| b4 | stage 2 | 0 |
| b5 | stage 1 | 0 |
| b1 | stage 2 | 0 |
| b6 | stage 2 | 0 |

In sheet metal bending operations planning, one of the main objectives is to find a sequence of operations that minimizes overall production time and cost. Operations planning for sheet metal manufacturing generally consists of three main tasks: (I) selecting the necessary bending tools; (II) finding the best possible operation sequence; and (III) performing setup planning. The first step, selecting the necessary bending tools, involves selecting punches, dies, punch holders and die holders according to the particular bends that are to be performed on the workpiece. The next step, finding the best possible operation sequence, includes the task of determining the operation sequence which will reduce the overall cycle time (i.e., the sum of the setup time and the execution time). The last task, setup planning, involves generating the most optimal press-brake setup and assigning each bending operation to the appropriate tooling stage in the set up. The above-noted tasks are highly inter-independent and strongly influence each other.

According to an aspect of the present invention, an expert planning system is provided which is capable of performing all of the above-noted tasks in operations planning. The expert planning system may include a tooling planner that solves this problem at two different levels. At the first level, the tooling planner selects tools for various bending operations and finds the tooling-imposed ordering constraints on various bending operations. This may be performed by determining the most likely shape of the workpiece for various bending operations and selecting the minimal tool set (i.e., a tool set having the minimum number of tool types) that works for these intermediate workpiece shapes. At the second level, a state space search is performed. During this search, various operation sequences are analyzed and the tooling planner favors the one which requires the least amount of setup efforts. This may be performed by conducting setup planing for partial operation sequences. Partial operation sequences that result in better setups and appear most promising may be examined first, resulting in improved computation efficiency. Among all of the operation sequences examined during this state space search, the operation sequence resulting in the least setup effort may be favored and selected by the tooling planner.

In accordance with an aspect of the invention, the various features and aspects of the present invention may be implemented as part of an expert planning system of a sheet metal manufacturing facility. The expert planning system may be a software-based application which resides on a network-based server module, such as that shown in FIGS. 1A or 1B. Alternatively, the features of the invention may be provided as part of an expert planning system which resides as an independent or stand-alone application of a computer-based workstation or control system of the manufacturing facility.

Figure 9A:
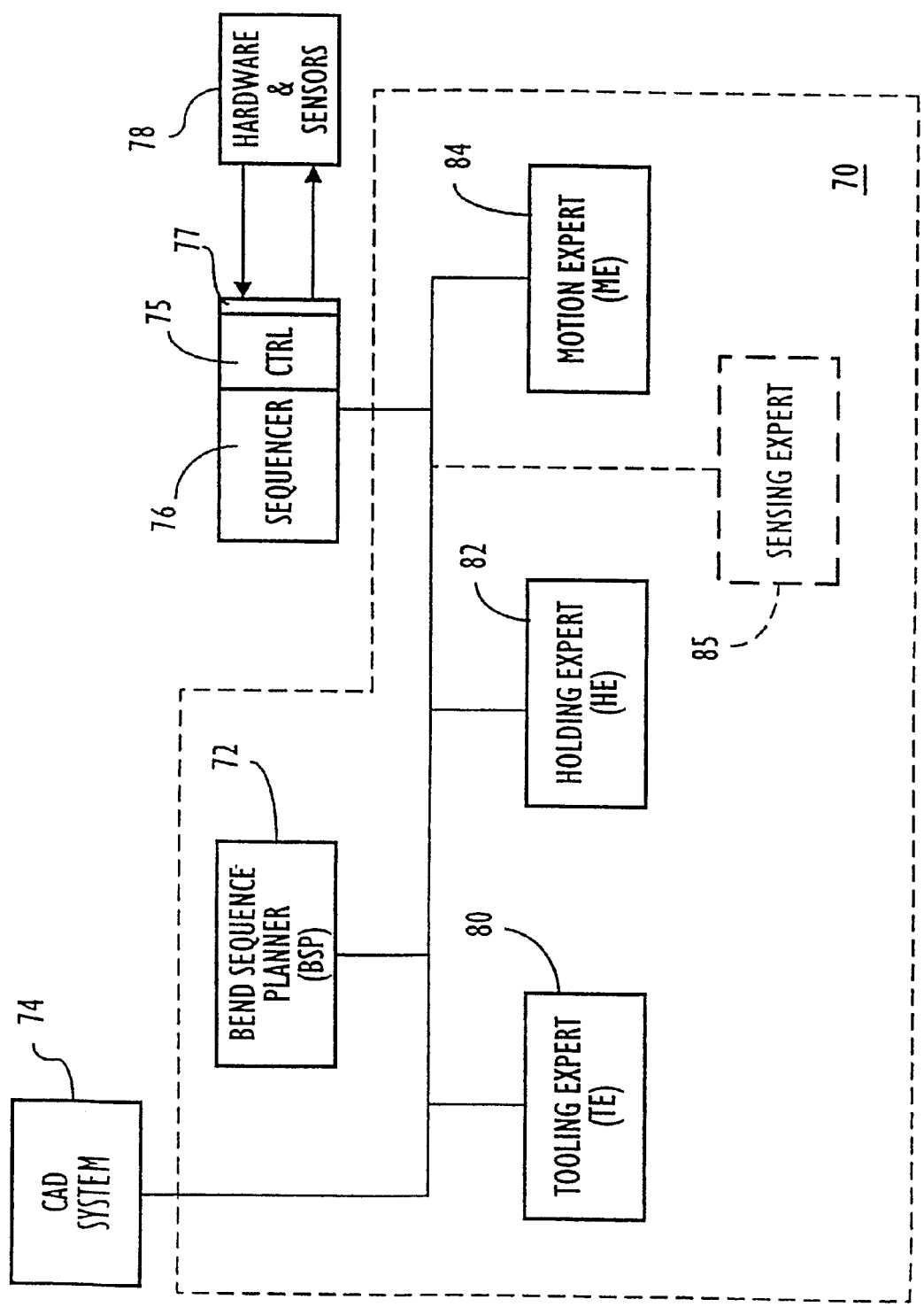
FIG. 9A illustrates an exemplary architecture of an expert planning system in which the various features and aspects of the present invention may be implemented.

For example, the present invention may be implemented as part of an independent workstation, such as a CAD or CAD/CAM workstation, and may provided fully automated features to generate expert planning information or may be interactive in nature to generate expert planning information based on input provided from an operator. In addition, it is possible to provide the features and aspects of the invention as part of a tooling expert or planner module of an expert planning system, as noted above. In such a case, the expert planning system may comprise one or more experts or planners for generating and providing expert planning information that is utilized to control various equipment (e.g., a press brake and/or robot manipulator) to carry out various operations, including sheet metal bending operations. The tooling expert or planner may be configured to work independently or together with other experts to generate the setup planning information. FIG. 9A illustrates an exemplary architecture of an expert planning system 70 which includes a tooling expert or planner incorporating the various features and aspects of the present invention.

As illustrated in FIG. 9A, expert planning system 70 may comprise a plurality of expert modules and/or planners. For example, in the illustrated embodiment, expert planning system 70 includes a bend sequence planner 72 and a plurality of expert modules or sub-planners, such as a tooling expert or planner 80, a holding expert or planner 82 and a motion expert or planner 84. Additional experts may also be provided, such as a sensing expert or module 85, as illustrated in dotted lines in FIG. 9A. Various components may interface with expert planning system 70 in order to facilitate input and output of relevant information and data. For example, as shown in FIG. 9A, a design or CAD system 74 and sequencer 76 may be provided that interface with expert planning system 70 through direct or network connectivity. Design or CAD system 74 may provide various functions relating to part design and part modeling according to a customer's specification. Sequencer 76 may interpret commands or information from the expert planning system, and control execution of the setup plan through the use of a controller 75, an interface 77 and the various equipment hardware and sensors 78 of the bending workstation.

Design or CAD system 74 and expert planning system 70 may be provided in a networked environment, such as that illustrated in FIGS. 1A and/or 1B, or may be located on a stand-alone workstation. For example, bend sequence planner 72, experts 80, 82 and 84, and CAD or design system 74 may be implemented within a UNIX compatible environment on a workstation computer, such as a SPARC 10 Sun OS V.4.1.3. Sequencer 76 may be implemented, for example, within an additional CPU coupled to the Sun workstation via a bus adaptor. The bus adaptor may comprise a Bit 3 VME-to-VME bus adaptor which extends between the Sun workstation and a remote VME bus passive back-plane. The passive back-plane may hold several interface mechanisms such as VME (Virtual Memory Extension) boards, which together form part of interface 77, as illustrated in FIG. 9A. Further, sequencer 76 may be implemented within a real time UNIX-compatible multi-processor operating system, such as CHIMERA, and may be run by an additional CPU which is provided in the computer workstations back-plane. Further, the various features and aspects of CAD system 74, bend sequence planner 72, experts 80, 82, 84 (and/or 85) and sequencer 76 may be implemented through any suitable combination of hardware, software and/or firmware. A high level programming language, such as C++, may be utilized to implement these various components and the control of the operations of the computer workstation. For more information on CHIMERA, see, for example, STEWART et al., Robotics Institute Technical Report, entitled "CHIMERA II: A Real-Time UNIX-Compatible Multiprocessor Operating System For Sensor Based Control Applications", Carnegie Mellon University (CMU), CMU-RI-TR-89-24 (1989), the disclosure of which is expressly incorporated herein by reference in its entirety.

As noted above, CAD or design system 74 may be provided to facilitate design of a sheet metal configuration. This may be achieved by defining the shape of a flat sheet metal part and the bends to be performed on the stock part to form a desired 3-D finished part. In designing the sheet metal part, CAD system 74 may form one or more information files which describe the part. As a 3-D part is designed, the CAD system 74 may maintain in memory a 3-D representation of the sheet metal part in parallel with a 2-D representation of the part. An interface may be provided in the CAD system to permit a designer to modify the design by adding or removing details to and from their respective representations. Such an interface may include a display screen, keyboard, mouse and other input/output devices.

Bend sequence planner 72 may operate in cooperation with tooling expert or planner 80, holding expert or planner 82, motion expert or planner 84 and any other experts (e.g., sensing expert 85) to produce a plan for complete part production by, for example, a bending workstation of the manufacturing facility. The production of the part may be based on the part designed with the use of the CAD or design system 74. The various features and aspects disclosed in U.S. patent application Ser. No. 08/386,369 may be utilized for implementing the various planners and expert modules of the expert planning system 70 illustrated in FIG. 9A. For example, bend sequence planner 72 may perform functions such as proposing a particular bend in a hypothetical bend sequence, and determining what initial steps must be performed by the system in order to execute such a bend having a position within the hypothetical bend sequence. In determining the consequences of the proposed bend, bend sequence planner 72 may query tooling expert or planner 80 as to what tooling would be needed to execute the proposed bend, query holding expert or planner 82 as to how the workpiece can be held while performing the proposed bend, and query the motion expert or planner 84 as to whether and to what extent the robot, which is holding the workpiece, can be manipulated to assist the making of the bend. If a sensing expert 85 is provided, bending sequence planner 72 might query sensing expert 85 as to whether a particular sensor-based control strategy is needed in order to facilitate the execution of the proposed bend by the workstation and the costs associated with a particular sensor-based control strategy. Bend sequence planner 72 may be configured to continually propose bends from a first bend consecutively to a last bend in a complete bend sequence, thus resulting in a complete set of bends to perform the final workpiece. Once the successful final bend sequence has been generated in this manner, bend sequence planner 72 may be configured to generate a final plan (which includes a general list of steps and accompanying information needed to control execution of the various hardware elements of the bending workstation), and forward the plan to sequencer 76.

Sequencer 76 may direct execution of the plan developed by the bend sequence planner 72. Sequencer 76 may interpret commands given by the bend sequence planner 72 and the resultant plan, and control timing of the various commands by parsing the commands and information accompanying the commands, and by placing them into queues provided for each of the main hardware elements of the sheet metal bending workstation.

Controller 75 may comprise a plurality of tasks which correspond to the various hardware elements of the workstation. Each task may be activated by the sequencer 76 in an appropriate manner in accordance with the plan forwarded by the bend sequence planner 72.

In operation, bend sequence planner 72 may analyze the designed sheet metal part provided by CAD system 74 and offer a bend sequence to be performed by the bending workstation. Planner 72 may utilize a state-space search method in order to determine an efficient sequence of bend operations that can be utilized by the bending workstation. Planner 72 may converse with tooling expert 80, holding expert 82 and motion expert 84 in order to obtain the information it needs to make its decisions.

Tooling expert 80 may respond to queries made by planner 72, and provide information to the bend sequence planner, such as which tools will be needed for a particular bend operation or bend sequence. In addition, tooling expert 80 may inform bend sequence planner 72 of the arrangement of tools within the workstation. Tooling expert 80, in conjunction with planner 72, will attempt to design a setup of tooling so that the fewest number of stages/toolings are utilized to make a particular part, i.e., to execute a complete bend sequence for making the part.

Holding expert 82 may make holding-related determinations such as, for example, whether the robot can hold the workpiece while a particular bend, specified by the bend sequence planner 72, is being performed. Holding expert 82 may also determine the location in which the robot should hold the workpiece so that the workpiece may be maneuvered through a series of bends, without collision, and without the need to change the robot's grasp on the workpiece. In addition, holding expert 82 may determine the position in which the repositioning gripper should hold the workpiece when the robot's grasp is being changed, and where suction cups of, for example, a loader/unloader (not shown) should be placed during unloading and loading of the workpiece.

Motion expert 84 may be provided for generating a motion plan, i.e., the manner in which the robot should be maneuvered, in order to move the workpiece through various spaces and along various routes as needed to execute the bends. As noted above, bend sequence planner 72 and the respective experts may be modular to communicate with each other in a query-based manner. All message passing among planners may be accomplished by Feature Exchange Language (FEL), which is a query-based language that was developed by David Bourne at the Robotics Institute of Carnegie Mellon University. Further information concerning FEL may be found in, for example, U.S. patent application Ser. No. 08/386,369. Messages may be sent between the various planners to facilitate development of the bending plan and setup plan. For example, before deciding to include a particular bend as part of the bend sequence, bend sequence planner 72 may query tooling expert 80 as to whether there is sufficient tools to handle the bend. Bend sequence planner 72 will then await a response from tooling expert 80. Tooling expert 80 will recognize the query from bend sequence planner 72, and will return with a response, e.g., indicating that there are sufficient tools to handle that particular bend noted by bend sequence planner 72. By way of a non-limiting example, bend sequence planner 72 may also ask holding expert 82 if a robot arm gripper 14 can remain holding onto the workpiece during a particular bend operation without repositioning its grasp of the workpiece. Holding expert 82 will then respond to the query made by the bend sequence planner 72, and bend sequence planner 72 will then utilize the information to perform its next determination.

Each of the modules of the expert planning system 70 may utilize one or more functions provided by a geometric modeling library (not shown) in order to model the relative interactions and positions of each part and the hardware components of the system, as may be needed in making their determinations. For geometric modeling and reasoning, a NOODLES geometric kernel may be utilized. For further information on the NOODLES modeler, see, for example, GURSOZ et al., "Boolean Set Operations On Non-Manifold Boundary Representation Objects," *Computer Aided Design,* Butterworth-Heinenmann, Ltd., Vol. 23, No. 1, January 1991, the disclosure of which is expressly incorporated herein by reference in its entirety.

Once a bending plan (including the bending sequence) is generated by the expert planning system 70, the system will then perform a setup planning process. The setup planning process may be performed to determine a setup plan which defines the various tooling and fixture requirements and arrangements for the bending workstation. The actual setup process can be performed, for example, manually at a press brake by a bending operator, or it may be automated in full or in part with the use of the expert planning system of the present invention.

As noted above, the various features and aspects of the present invention may be implemented in a wide variety of network architectures and environments. For example, the invention may be implemented as part of an expert planning system which resides as an application on a server module of a distributed sheet metal bending factory (see, for example, FIGS. 1A and 1B). Such an expert system may have a distributed planning architecture that consists of a number of specialized planners, such as grasping, tooling and motion planners, wherein each of the various planners communicate with other using socket-based communication. The various features of the present invention, including the setup planning techniques and operations of the invention, may be implemented as part of a tooling and setup planner (referred to as tooling planner or tooling expert herein) of the expert planning system. Further, these features may be implemented through software using C++ programming language techniques and computer workstations (such as server module 32). The computer workstation may comprise various hardware such as a SPARC 20 workstation or a 200 MH Intel Pentium workstation. For geometric modeling and reasoning, a NOODLES geometric kernel may be utilized and a graphical interface which includes, for example, a HOOPS graphics library, which is commercially available from Autodesk, Inc., may be included. All message passing among the specialized planners of the expert planning system may be accomplished by Feature Exchange Language (FEL) which was developed at CMU, as indicated above.

The various features and aspects of the present invention may be utilized for generating and determining a setup plan for individual parts or for multiple parts. The setup planning techniques of the present invention may be implemented as part of a tooling expert or planner, such as tooling expert 80 in the illustrated embodiment of FIG. 9A. Such a tooling expert may cooperate with other expert modules or planners, or may be an independent/stand-alone module of an expert planning system for providing setup planning information. The setup planning information may be generated based on the determination of resource constraints, such as tool stage length constraints, for the operations to be performed on the part. The features and aspects of the invention, however, may be applied to other process planning tasks in different application domains. For instance, the features of the present invention may also be utilized to solve other one-dimensional resource constraints, such as tool height constraints, for milling, punching, drilling, welding and other types of part production applications. Further, the invention may be adapted to solve gripper constraints for robot grasping operations to be performed on a part. The present invention may also be applied to facilitate the production of a wide variety of part types, such as metal, wood, plastic and composite parts, and should not be construed to be limited to the production of sheet metal parts. For purposes of discussion, FIG. 9B illustrates, in diagram form, an exemplary process by which multi-part planning may be performed according to the features of the invention.

Figure 9B:
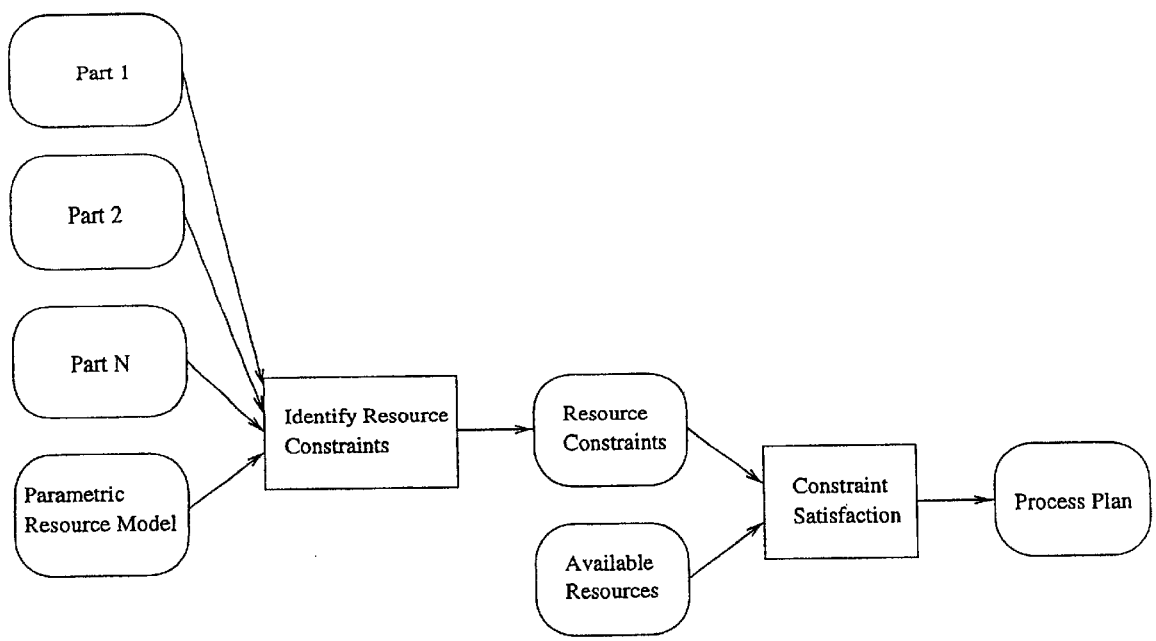
FIG. 9B illustrates, in accordance with an aspect of the invention, an exemplary process by which multi-part setup planning may be performed according to the features of the invention.

In FIG. 9B, the logic of an exemplary multi-part planning process is provided. According to an aspect of the present invention, multi-part setup planning for sheet metal bending operations may be performed on a variety of parts (Part 1–Part N). Rather than matching part features to existing manufacturing resources (i.e., tools and fixtures), the present invention uses an approach that allows process planning for multiple parts by first identifying the constraints imposed by a part feature on the tooling and setups that will be used to create that feature. That is, for each part (which may be represented by a geometric model), resource constraints are identified before a setup plan is determined that will satisfy multiple parts. The resource constraints may include, for example, a tool length or height constraint for performing the operation on the part. For example, if a part requires bending a 50 mm flange, the tooling planner will generate a resource or setup constraint which indicates that this operation can be performed by a tool segment of size 50 mm or greater. Similar setup constraints will also be determined for the other parts and bending operations to be performed. After gathering all of the resource or setup constraints, defined by the various features of the parts, setup planning will be performed to determine and identify a setup plan that works for multiple parts based on the defined resource constraints and the resources that are available (e.g., the tools that are available). For example, suppose it is determined that another part requires the bending of a 100 mm flange. This part would lead to a setup constraint indicating that this operation can be performed by a tool segment of size 100 mm or greater. In this case, the invention can setup a process plan using a tool segment of size 100 mm (as indicated from the available resources) which would work for both the part requiring a 50 mm flange and the part requiring a 100 mm flange.

Referring now to the exemplary embodiment of FIG. 10, a description of the various processes and operations that may be performed by the expert planning system of the invention to provide operations planning for sheet metal bending operations will be described. The operations planning may be performed for both individual parts and for sets of multiple parts. As noted above, the present invention is not limited to operations planning for sheet metal bending, and may be applied to other application domains (such as milling, punching, drilling, etc.). Further, the present invention may be utilized to determine a wide variety of one-dimensional resource constraints, including tool length or height constraints and gripper constraints.

As explained above, operations planning for sheet metal bending generally consists of three main tasks: (I) selecting the necessary bending tools; (II) finding the best possible operation sequence; and (III) performing setup planning. These tasks may be performed when carrying out the sheet metal bending operations planning features of the invention. The exemplary embodiment of FIG. 10 illustrates the various processes and operations of the expert planning system and tooling planner. These features may be implemented by any suitable combination of hardware, software, firmware or programmed logic, and may be provided in various network architectures and system components. For example, as noted above, the invention may be implemented in manufacturing facilities which include bending workstations that perform sheet metal bending operations to produce sheet metal parts. Such workstations may include press brake equipment that is controlled manually or include robotic or automated machinery to facilitate handling and bending of sheet metal workpieces by the press brake equipment. The present invention may also be implemented as part of an integrated or stand-alone expert planning system. Such a system may be provided at a bending workstation of the manufacturing facility, or may be integrated with a CAD or CAD/CAM system. The features of the invention may also be fully automated to provide expert planning information, including machine setup information for performing operations on each part, or may be implemented as part of an interactive system that permits manual input from an operator to generate expert planning information.

Figure 10:
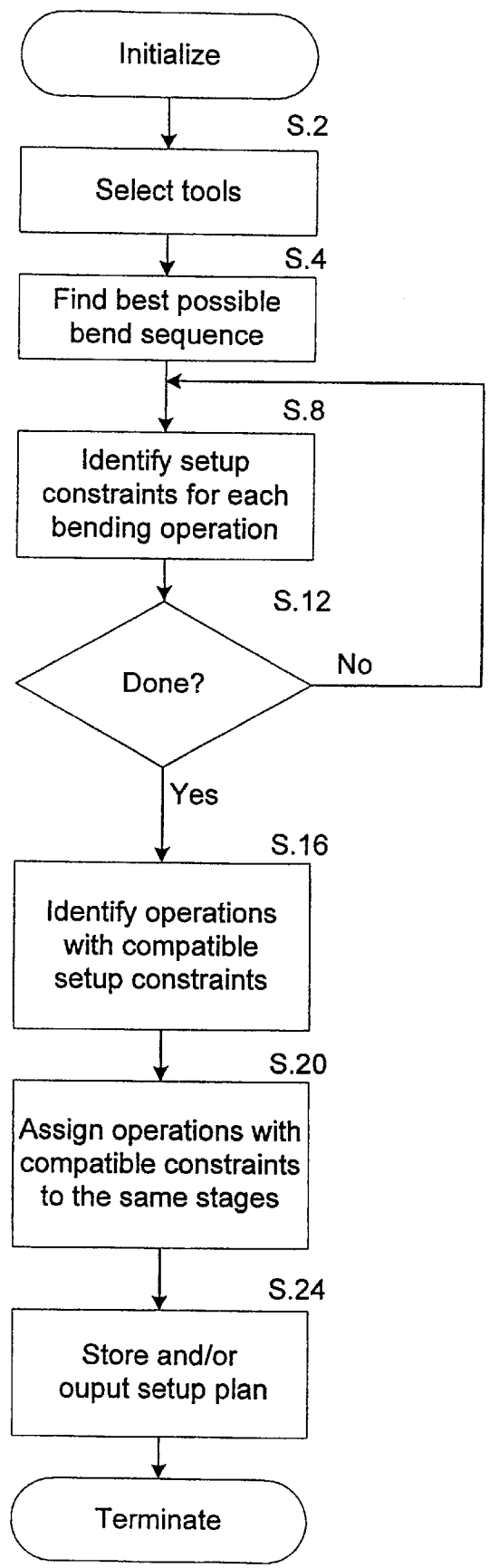
FIG. 10 is a flow chart of the various processes and operations that may be performed by the expert planning system of the present invention to provide operations planning for carrying out sheet metal bending operations.

As shown in FIG. 10, after initializing the expert planning system, the tooling planner of the expert planning system will select the necessary bending tools at step S.2. Various methods may be utilized for selecting the bending tools. For example, by analyzing the geometry of the part, the length of each bend line, and/or the form or type of bend required the tooling planner may select tools for various bending operations. A library of available tools may be stored in the database to provide information to the tooling planner as to what tooling resources are available. Minimum bending tool definitions may then be determined and assigned for each bending operation (i.e., for a 50 mm flange, the tooling planner may designate that a bending tool of 50 mm or greater be provided). The tooling planner may perform this operation alone or in cooperation with other planners of the expert planning system (such as the bend sequence planner of FIG. 9A).

After selecting and determining the bending tools (from the available tooling resources) for each bending operation, the expert planning system may then determine the best possible bending sequence at step S.4. The bend sequence or operation sequence for each part may be determined at step S.4 by using various techniques, such as state space search methods, and analyzing each cost. By way of a non-limiting example, the state space search method and techniques disclosed in U.S. patent application Ser. No. 08/386,369 may be utilized to determine the bend sequence at step S.4. The determination of the bend sequence may be performed independently by the tooling planner of the expert planning system, or in cooperation with other planners/expert modules of the expert planning system, such as the bend sequence planner. Alternatively, the bend sequence may be designated by a machine tool operator or in accordance with a customer's requirements, and set in a data file read by the expert planning system.

As further shown in FIG. 10, after the tooling and bending operation sequence is determined, the tooling planner then may perform setup planning at steps S.8–S.24. In accordance with an aspect of the invention, setup planning may be performed through two main stages. That is, in the first stage, the setup constraints are generated for each operation (see, e.g., steps S.8–S.12 in FIG. 10), and then in the second main stage, these constraints are solved to create a setup plan that satisfies all the constraints generated in the previous step (see, e.g., steps S.16–S.24 in FIG. 10). This approach allows setup planning to be solved for multiple-part problems. For multi-part problems, setup constraints may be generated and tracked (i.e., which bending operation and which part leads to what setup constraint). For every bending operation, the intermediate workpiece geometry and the tool geometry impose constraints on the tooling stages that will be used to perform the bending operation. These constraints restrict the maximum tool stage length and require certain minimum gaps between tooling stages. Further, these constraints determine if more than one operation can be done on the same tooling stage. Every feasible press brake setup should, therefore, respect these constraints. The intermediate workpiece shape is determined by the bending sequence. As a result, the type of tools and the bending sequence will have a strong influence on the setup constraints.

Therefore, as shown in FIG. 10, at step S.8, the setup constraints are identified by the tooling planner for every bending operation in the given set of operation sequences. Setup constraints may be generated by analyzing any potential interference problems between geometric models of the tool and the intermediate workpiece. Such setup constraints describe the length restrictions on tooling stages and also identify the required gaps between tooling stages, as noted above. Various techniques and methods may be utilized for generating setup constraints. For example, in accordance with an aspect of the present invention, setup constraints may be generated by constructing geometric models of the sheet metal part at each bending stage and analyzing part-tool intersection regions to determine setup constraint parameters. In particular, the tooling planner may first construct a geometric model of the workpiece for each bending operation (i.e., an intermediate part model may be constructed of the part at the time of each bending operation), and then a geometric intersection may be determined of the intermediate part model with the model of a tooling stage spanning the entire press brake tooling space. Thereafter, the tooling planner may analyze the part-tool intersection regions to determine setup constraint parameters. An exemplary process for generating setup constraints is provided below (see, e.g., FIGS. 11A–11C and 12), in accordance with the aspects and features of the invention.

As shown in FIG. 10, step S.8 may be repeated for each bending operation. Therefore, at step S.12, logic flow will return to step S.8 as long as it is determined that setup constraints have not been defined for each of the defined bending operations of each part (No at step S.12). After all of the setup constraints have been defined (Yes at step S.12), the tooling planner may then generate a setup plan according to steps S.16–S.24. That is, at step S.16, the tooling planner may identify bending operations within compatible setup constraints, and then assign the operations with compatible constraints to the same stages at step S.20. The setup plan may then be stored and/or provided as output at step S.24 by the tooling planner. Thereafter, the operations planning routine may terminate, as illustrated in FIG. 10.

At step S.16, the tooling planner may partition the set of bends into various compatibility sets (i.e., sets of bends having compatible setup constraints) based on the setup constraints determined at step S.8. Compatibility sets may be determined based on the identification of bends which may be performed on the same tooling stages; and, thus, bends which are in the same compatibility set are capable of being performed at the same tooling stages. At step S.20, the tooling planner may assign bending operations within compatible constraints to the same stages, as noted above. That is, after identifying compatibility sets, the tooling planner may combine compatible constraints into composite constraints. Composite constraints are the union of a set of compatible constraints. Any tooling stage that satisfies the composite constraint also satisfies all of the individual constraints that form the composite constraint. Therefore, these composite constraints may be used to generate tooling stages that satisfy these constraints. Further, bending operations may be assigned to tooling stages by specifying their relative locations with respect to stages. An exemplary process by which the compatibility of setup constraints may be determined is provided below (see, e.g., FIG. 13) in the detailed description which follows hereinafter.

Referring now to FIGS. 11A–11C and 12, a detailed discussion of the manner in which setup constraints may be generated will be provided, in accordance with an aspect of the invention. In addition, a concrete example of setup constraints that may be generated for an exemplary part will be provided. As noted above, the tooling planner will identify setup constraints for each bending operation after the bending tools and operation sequence have been determined (see, for example, step S.8 in FIG. 10). Since the various bending operations will impose constraints on tooling stage lengths, the tooling planner may compute setup constraints resulting from the various bending operations. Setup constraints may be generated by analyzing any potential interference problems between the geometric models of the tool and the intermediate workpiece or part. These constraints will describe the length restrictions on tooling stages and identify the required gaps between tooling stages. Setup constraints may be generated by first constructing a geometric model of the workpiece at the time of each bending operation. This model is referred to herein as the intermediate part model. After constructing the intermediate part model, a geometric intersection of the intermediate part model and the model of the tooling stage spanning the entire press brake tooling space may be performed. By performing the geometric intersection, the part tool intersection regions may be analyzed to determine the setup constraint parameters.

Figure 11C:
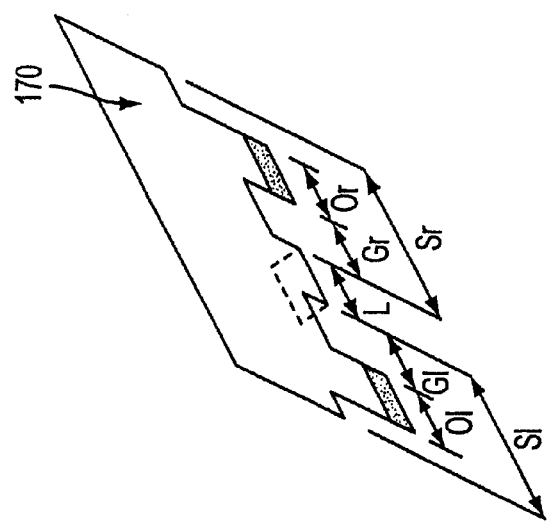
FIGS. 11A, 11B, and 11C graphically represent an exemplary setup constraint generation technique for a sheet metal part, in accordance with an aspect of the present invention.
Figure 11B:
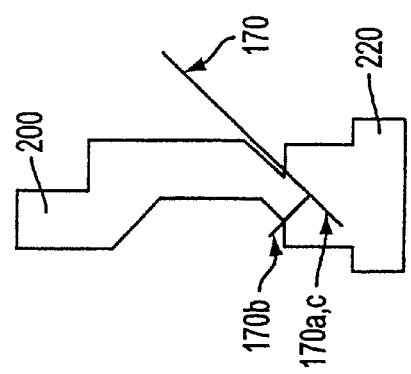
Figure 11A:
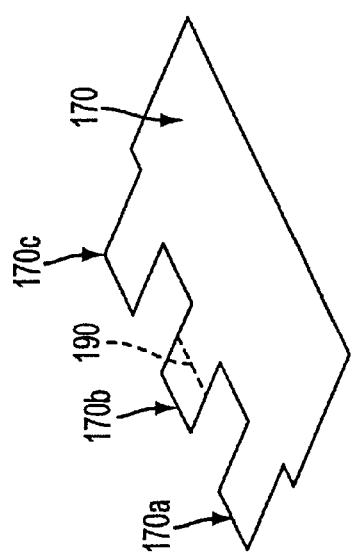

FIGS. 11A–11C illustrate an exemplary setup constraint generation for an exemplary part. In FIG. 11A, an exemplary sheet metal part is illustrated (in its initial flat stage), in which a bend line 190 is defined at a middle tab 170b of the sheet metal workpiece 170. In this example, the workpiece 170 includes tabs 170a, 170c on both sides of the proposed bend intersection with the die 220 (see, for example, FIG. 11B), as determined by a geometric intersection test performed by the tooling planner. Therefore, this bend cannot be performed on an infinitely long tooling stage. The minimum tooling stage length for this operation therefore given by the following:

L–tolerance where "L" is the length of the bend line (see, for example, FIG. 11C) and "tolerance" is a predetermined tolerance. That is, the minimum allowed tooling stage length should be slightly smaller than the bend length, with a predetermined tolerance (e.g., 2 mm). Reducing the tooling stage length by more than the predetermined tolerance may result in poor bend quality.

Further, in order to avoid interference between the tool and the intermediate workpiece, the maximum allowed tooling stage length is defined by the following:

Gr+Gl+L−clearance where "Gr" is the gap length on the right side of the bend, "Gl" is the gap length on the left side of the bend (see, for example, FIG. 11C), "L" is the length of the bend line, and "clearance" is a predetermined clearance. That is, the maximum allowed tooling stage length should be slightly smaller than the overall gap around the bend, with a predetermined clearance (e.g., 2 mm). The actual setting of the clearance amount will, of course, depend upon the accuracy of the part placement with respect to the tools of the press brake. Further, in view of the tolerance and clearance restrictions, adjacent stages should also clear any recommended or required safety margins.

In accordance with an aspect of the invention, the following six parameters may be utilized to define the setup constraints associated with each bend line:

Gr: Gap length on the right side of the bend. This denotes the distance by which a tooling stage can be extended towards the right side of the bend.

Gl: Gap length on the left side of the bend. This denotes the distance by which a tooling stage can be extended towards the left side of the bend.

Or: Obstruction length on the right side of the bend. This denotes the space in which no tooling segment is allowed on the right side of the bend.

Ol: Obstruction length on the left side of the bend. This denotes the space in which no tooling segment is allowed on the left side of the bend.

Sr: Safety distance on the right side of the bend. This denotes the minimum distance between the bend and the next tooling stage towards the right side of the bend.

Sl: Safety distance on the left side of the bend. This denotes the minimum distance between the bend and the next tooling stage towards the left side of the bend.

Figure 12:
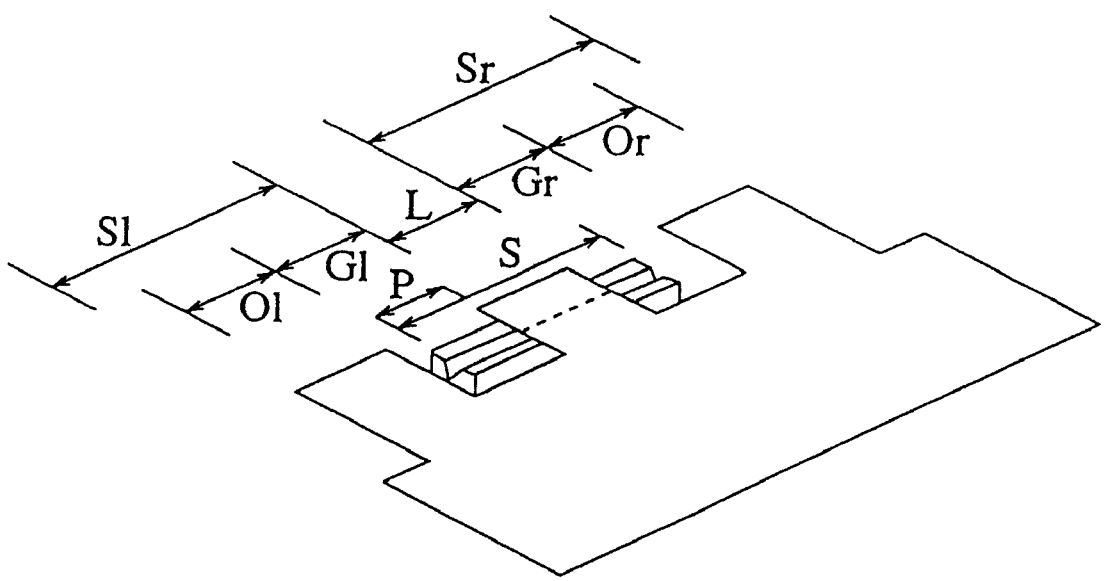
FIG. 12 illustrates the various setup constraint parameters of an exemplary sheet metal part, in accordance with an aspect of the invention.

FIGS. 11C and 12 illustrate these respective constraint parameters in relation to the exemplary sheet metal part of FIG. 11A. With these parameters, the following setup constraints may be defined:

$Gr+Gl+L-clearance \geq S \geq L-tolerance$ $Gl-0.5(clearance) \geq P$ $Gr-0.5(clearance) \geq S-P-L$ $Sr \leq S-P-L+Dr$ $Sl \leq P+Dl$ In the above-noted setup constraints, "Dl" is the distance between the present stage and the left adjacent stage, "Dr" is the distance between the present stage and the right adjacent stage, "L" is the length of the bend line, "S" is the length of the tooling stage, and "P" is the relative position of the bend line with respect to the left edge of the tooling stage.

Setup constraints for collinear bends may be generated by combining setup constraints for various individual bends in the collinear bend. For interrupted collinear bends, additional constraints may be present on the gaps between adjacent stages. For example, in cases of collinear bends, additional constraints on the placement of stages with respect to each other may be present. Relative positions of various stages with respect to each other in a collinear stage group may be such that for each individual bend $b_i$ in the collinear bend, there exists a relative position Pi with respect to Si (i.e., the stage to which $b_i$ has been assigned) that satisfies the setup constraints for $b_i$.

Once all of the setup constraints for a partial or complete bend sequence have been computed, the tooling planner may then proceed with setup planning, as discussed above with reference to FIG. 10 (see, e.g., steps S.16–S.24). When performing setup planning, the tooling planner may create setups that involve the minimum number of tooling stages and that fits on the die rail of the press brake. As discussed above, the tooling planner first identifies bending operations with compatible setup constraints (see, for example, step S.16 in FIG. 10) and then generates setup plans by assigning bending operations with compatible setup constraints to the same stages (see, for example, step S.20 in FIG. 10). A more detailed description of these steps, and the various functions and operations which may be performed by the tooling stage when performing setup planning, will now be provided below, in accordance with an aspect of the present invention.

Various techniques and processes may be utilized to determine the compatibility of setup constraints. For example, two bending operations may be determined to have compatible setup constraints, if there exists a stage (or, a set of stages for collinear bends) which can accommodate both bending operations. The compatibility of two bending operations may be determined by establishing the feasibility of composite stages. The feasibility of composite stages may be determined to exist if two operations can be overlaid on each other, such that obstructions for one operation do not overlap on bend lines for the other, and vice versa. If such conditions exist, then the tooling planner can create composite stages which can accommodate both operations.

Figure 13:
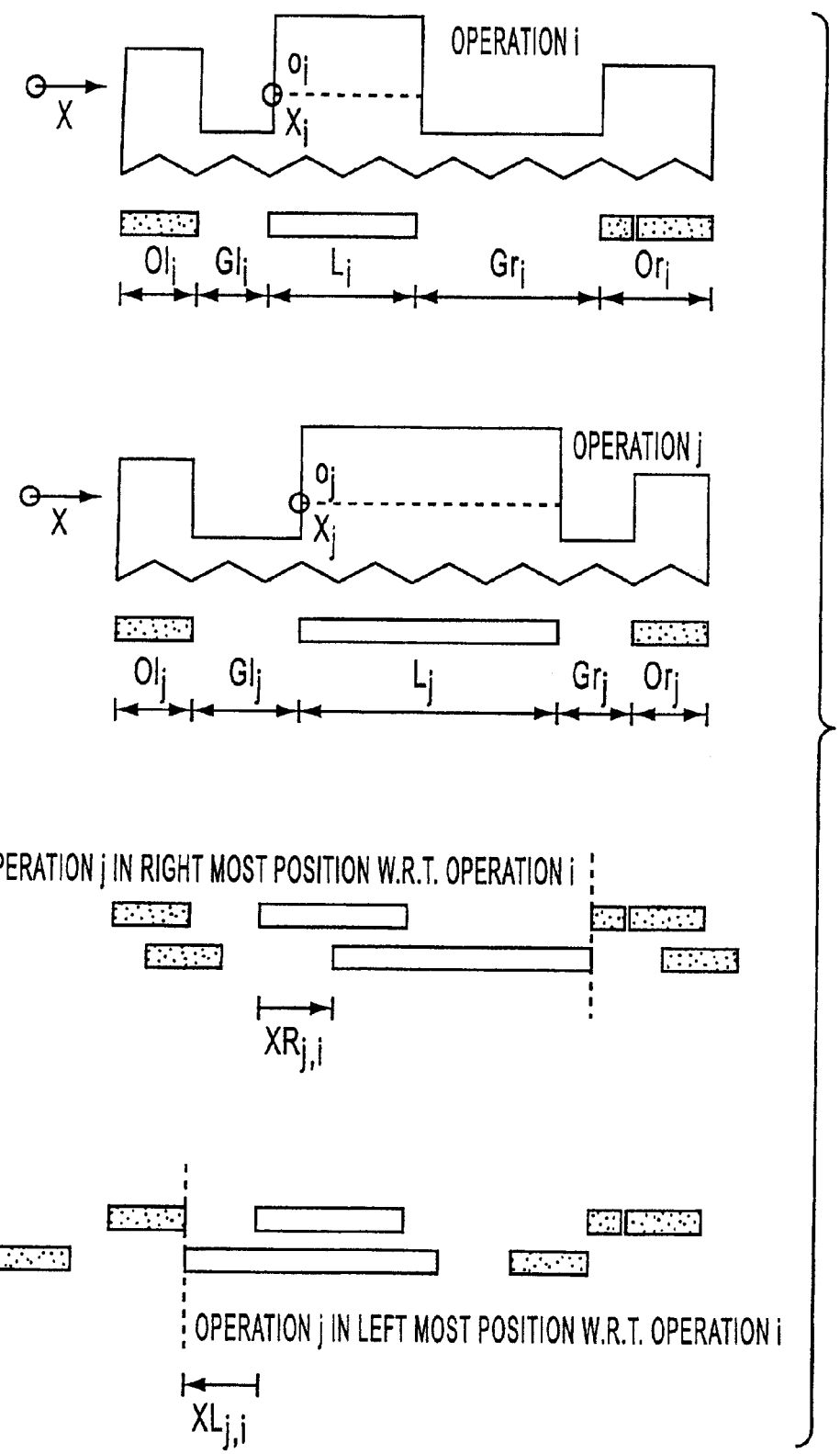
FIG. 13 graphically represents an exemplary process of the invention by which the compatibility of setup constraints may be determined.

Referring now to FIG. 13, an exemplary process by which constraint compatibility may be determined will be provided. Let i and j be two bending operations. Let $o_i$ and $o_j$ be reference points for these operations. Let $X_i$ and $X_j$ be the location of $o_i$ and $o_j$ in an arbitrarily defined one-dimensional world coordinate system. If setup constraints for two operations are compatible, then there will exist a range of relative positions of these operations in which obstructions for operation i will not overlap with the bend line for operation j, and vice versa. This condition can be mathematically expressed as follows:

$XL_{j,i} \leq X_j - X_i \leq XR_{j,i}$ where "$XL_{j,i}$" is the leftmost position of operation j with respect to operation i, and "$XR_{j,i}$" is the rightmost position of operation j with respect to operation i. FIG. 13 illustrates this concept graphically.

For simple bends, the positions $XL_{j,i}$ and $XR_{j,i}$ can be computed directly from the setup constraint parameters $L_i$, $Gl_i$, $Gr_i$, $L_j$, $Gl_j$ and $Gr_j$. If no feasible relative position range exists, then two operations are considered incompatible. For collinear bends, the positions $XL_{j,i}$ and $XR_{j,i}$ may be computed by taking the intersection of relative position ranges for bend lines that compose the collinear bend. Interval algebra may be used for computing relative position ranges for collinear bends. In such a case, the position range for each individual bend that composes the collinear bend may be computed. The position range for the collinear bend may be computed by taking the intersection of position ranges for individual bends (e.g., the collinear bend can only be placed on the positions which fall within the position ranges of every individual bend). With interrupted collinear bends, the interruption index of the composite stage should not exceed the maximum interruption index of the two collinear bends.

The compatibility of multiple bending operations may also be succinctly defined and determined. For example, in the case of n bending operations, the following two inequalities for every pair i,j (where i does not equal j) are defined:

$$X_j - X_i \leq XR_{j,i}$$

$$X_i - X_j \leq -XL_{j,i}$$

If there exists a vector $\{X_1, X_2, \ldots, X_n\}$ which satisfies the above inequalities, then n operations may be considered compatible. Standard linear programming techniques may be utilized to determine if such a vector exists. For example, iterative constraint propagation methods may be utilized to identify the relative position range of every operation in the pool. That is, an iterative constraint propagation method may be used to solve the linear programming problem. Generally, a constraint-network may be instantiated to keep track of the range of the possible positions of various bending operations with respect to each other. Initially, a randomly selected pair of operations from the set of operations may be selected and then added to the constraint-network. After adding these operations to the constraint-network, the position range for these two operations may be calculated. Thereafter, additional operations may be added to the constraint-network one at a time. Each time an operation is added to the constraint-network, the position ranges of all the operations in the network may be updated to account for the new operation. When all of the bending operations have been added to the network, feasible positions of various operations with respect to each other may be selected from the possible position ranges.

As noted above, various techniques and methods may be utilized for performing the setup planning features of the present invention. For example, state space search techniques may be performed to determine an optimum setup plan. During such a search, various operation sequences may be tried and the tooling planner may favor the one which requires the least setup efforts. This may be performed by conducting setup planning for partial operation sequences that result in better setups. Partial operation sequences that appear promising may be examined first, resulting in improved computation efficiency. Among all of the operation sequences examined during the state space search, the operation sequences resulting in the least setup effort may be most favored and selected by the tooling planner.

Figure 14:
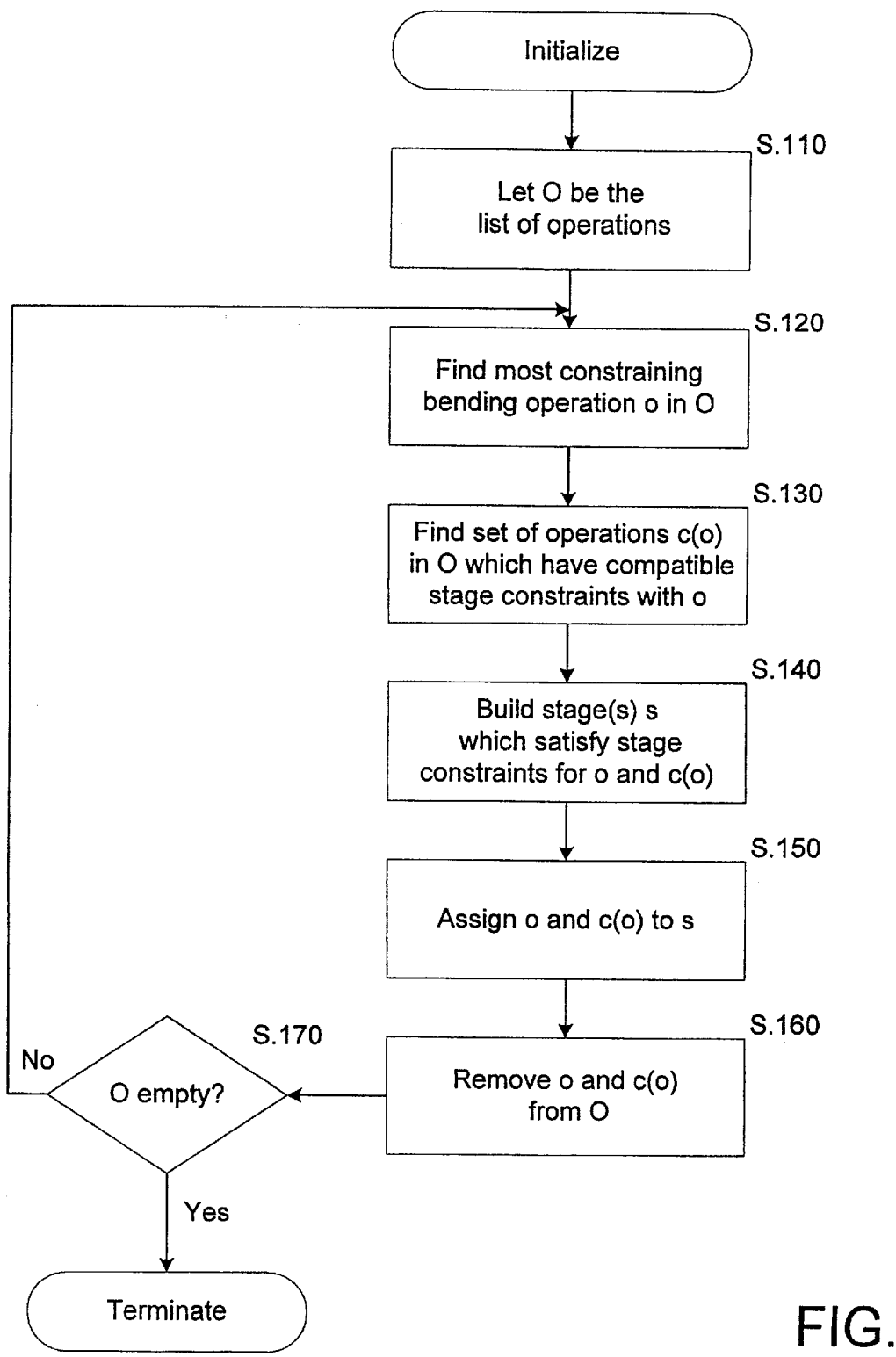
FIG. 14 is a flow chart of exemplary processes and operations that may be performed for setup planning, in accordance with another aspect of the present invention.

By way of a non-limiting example, FIG. 14 illustrates exemplary processes and operations that may be performed by the tooling planner when performing setup planning (i.e., the steps of S.16–S.24 in FIG. 10). As illustrated in FIG. 14, after the setup planning routine is initialized, the tooling planner may set O to the list of all possible bending operations to be performed on the family of parts at step S.110. Thereafter, at step S.120, the most constraining bending operation o in the list O may be determined. That is, for the operations contained in the list O, the most constraining bending operation may be determined. This may be performed based on various processes and techniques. For example, the collinear bend operation with the maximum interruption index in the list O may be located and identified as the most constraining bending operation at step S.120. If there are no collinear operations, then the bending operation in the list O with the maximum length (e.g., based on the length of the bend line) may be located and identified as the most constraining bending operation.

At step S.130, the tooling planner will find the set of operations c(o) in the list O which have compatible stage constraints with the most constraining bending operation o. The various methods and techniques described above may be utilized to determine the compatible stage constraints. After the compatible stage constraints are determined, at step S.140, a stage or set of stages s may be built which satisfy the stage constraints for o and c(o). Thereafter, at step S.150, o and c (o) may be assigned to the stages or stage s by computing relative locations of o and c(o) with respect to the stages or stage s. Thereafter, at step S.160, o and c(o) may be removed from the list O and then processing may proceed to step S.170. At step S.170, it is determined whether the list of operations O is empty. If it is determined that O is not empty (No at step S.170), then logic flow proceeds back to step S.120. Otherwise, the setup planning routine terminates (Yes at step S.170), as shown in FIG. 14.

The above-described setup planning process of FIG. 14 may be based on an incremental constraint propagation technique. During each pass, at least one bending operation may be assigned to a stage (or a set of stages) and this process may prohibit the use of back tracking. As a result, the setup planning process may run in polynomial time. If there are no interrupted collinear bends, then the optimal solution should be readily obtained. Setup planning may also be used as an evaluation function to guide the search for selecting a near-optimal operation sequence. In such a case, the setup planning process can be converted into a back tracking search routine to find the optimal answer or solution in every case.

After identifying required tooling stages and assigning various bends to stages, the tooling planner may arrange stages on the bending machine (i.e., the press brake) to minimize the motion efforts in transferring parts from one stage to the other. Various techniques may be utilized to identify part transfer frequency and to minimize workpiece movement. For example, a technique may be utilized which identifies part transfer frequency among all pair of stages and places stages with high frequency next to each other. Such a technique may take into account external stage position constraints that restrict a certain stage to be positioned at certain locations due to, for example, robot-grasping or part-gauging requirements.

With the use of a stage arrangement technique, the tooling planner may identify required tooling stages and assign various bends to stages and, thereafter, arrange stages on the bending machine to minimize the motion efforts in transferring the part from stage to another. During this step, the tooling planner may account for external stage positioning constraints that restrict certain stages to be positioned at certain locations due to, for example, robot-grasping or part-gauging requirements, as noted above. In particular, this process may include first identifying stages that should not be located on the extreme left position or the extreme right position of the bending machine. This may be done by analyzing the robot loading condition and gauging conditions for various bends assigned to a stage. A stage that requires a robot loading from the left side or has a gauge position towards the left side of a stage should not be located on the extreme left position. Similarly, a stage that requires robot loading from the right side or has a gauge position towards the right side of the stage should not be located on the extreme right position. As a next step, the tooling planner may identify part transfer frequency among all pair of stages. Finally, the stages may be arranged such that the stages with higher transfer frequency are placed next to each other. If after this step, any stages that should not be located on the extreme left or right position are located on the extreme left or right position, they may be exchanged with another stage such that it results in a minimum increase in the motion efforts.

Figures 15A, 15B:
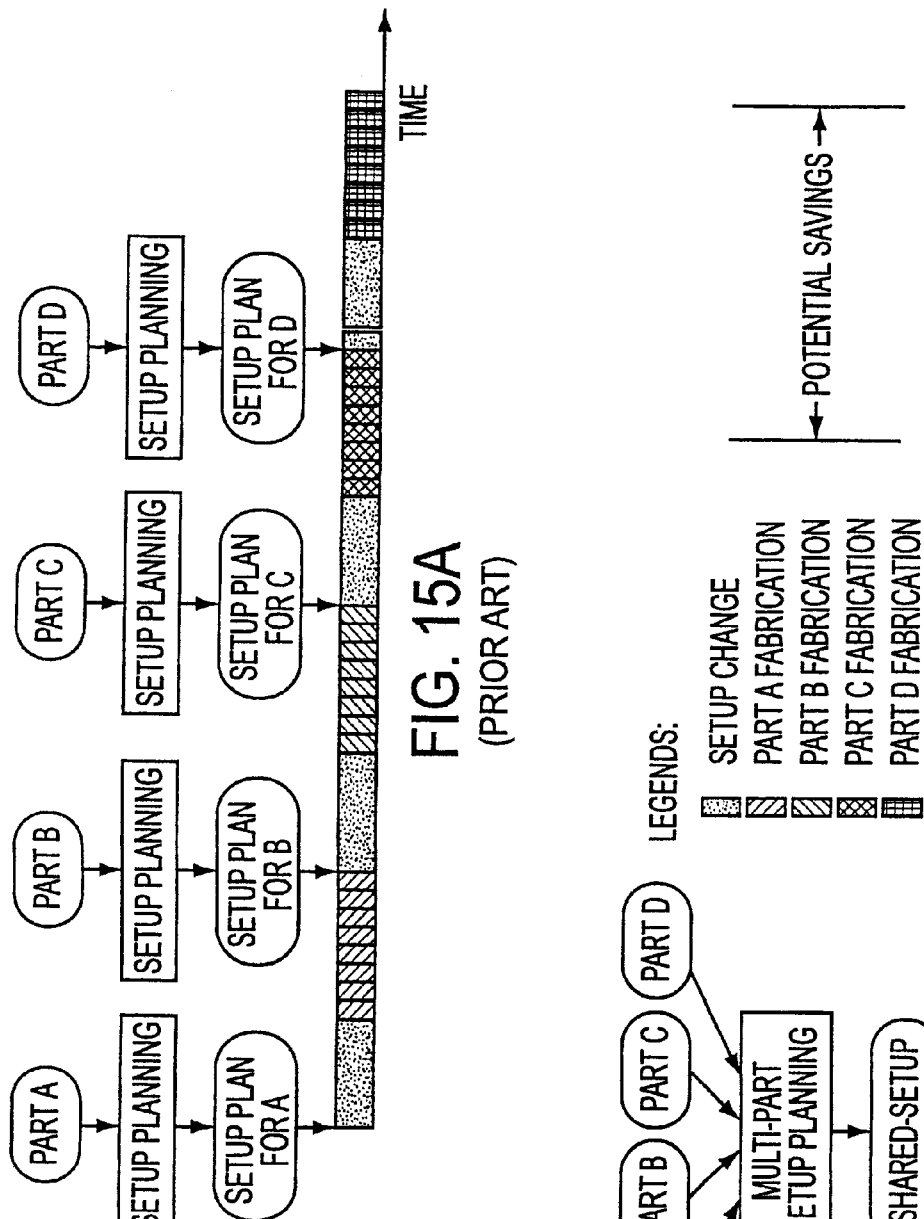
FIGS. 15A and 15B illustrate the potential cost savings (in terms of time) that may be obtained over conventional methods by utilizing the setup planning techniques of the present invention to generate shared-setups through multi-part setup planning.

The features of the present invention may be utilized for performing multi-part setup planning and generating shared-setups. FIGS. 15A and 15B illustrate the potential cost savings (in terms of time) that may be obtained over conventional methods by utilizing the setup planning techniques of the present invention to generate shared-setups through multi-part setup planning. Rather then generating process plans by considering one part at a time (see, e.g., FIG. 15A), according to the present invention multiple parts are considered simultaneously to exploit the opportunities of shared manufacturing resources and shared-setups (see, e.g., FIG. 15B). The approach of the present invention thus creates process plans that will be optimized over the entire set of parts, and utilizes tools and fixtures that will work for multiple parts. Such an approach not only improves the overall throughput of the manufacturing facility, but also allows parts to be scheduled in any arbitrary combination without requiring extra setups. This scheduling flexibility can be used to reduce in-process inventory and eliminate production delays or bottlenecks. By sharing setups, it is also possible for a manufacturing facility to handle a larger variety of parts in the shop-floor without significantly lowering the overall throughput.

Figure 16A:
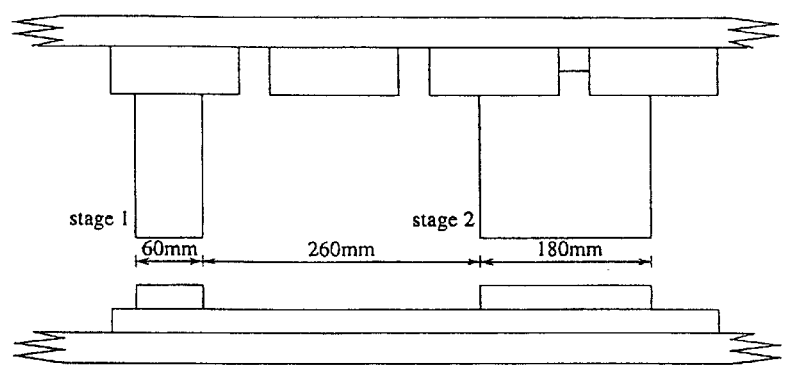
FIGS. 16A, 16B, and 16C illustrate, in accordance with an aspect of the invention, exemplary press brake setup solutions for each of the parts depicted in FIGS. 4A, 4B and 4C, respectively.
Figure 16B:
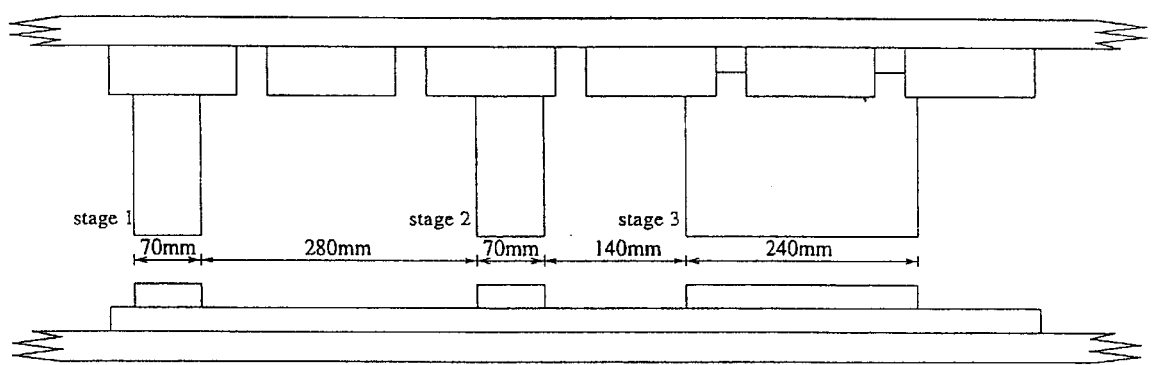
Figure 16C:
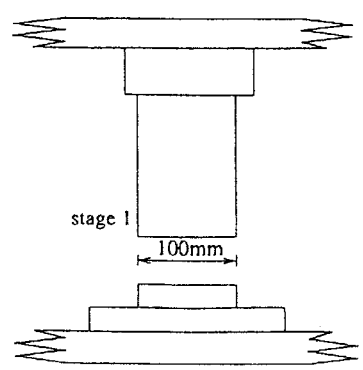
Figure 17:
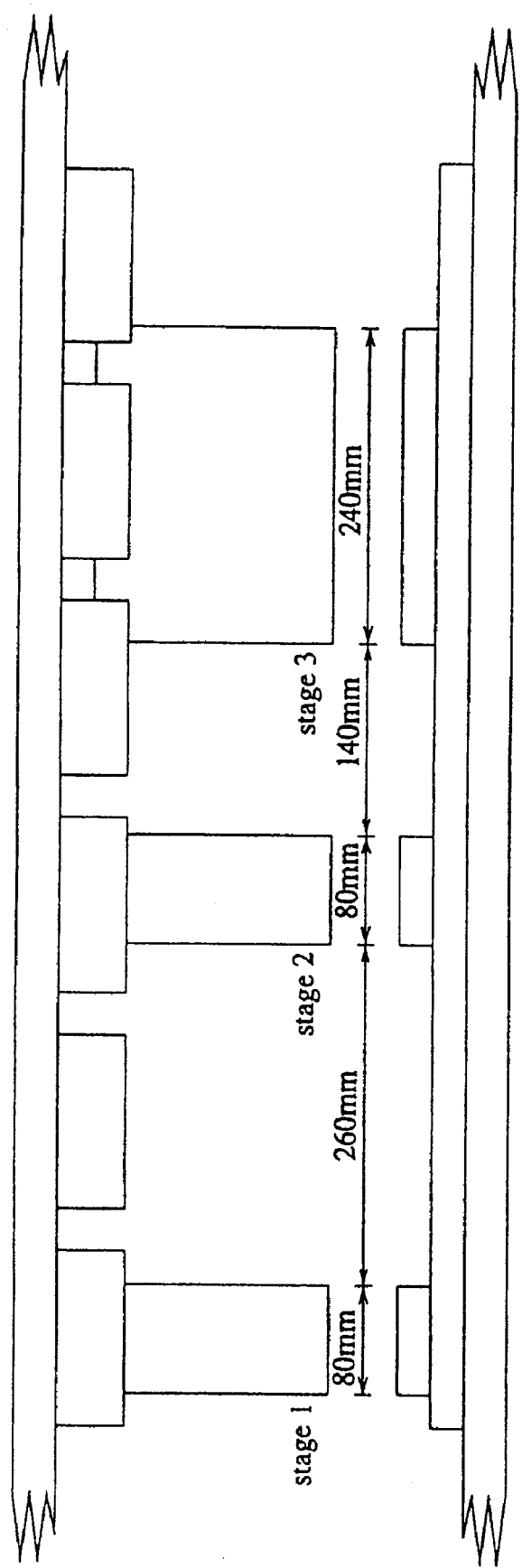
FIG. 17 illustrates, in accordance with the invention, an exemplary composite setup plan for the exemplary parts of FIGS. 4A, 4B and 4C.

For purposes of illustration, and to provide a further example of the benefits of the invention, FIGS. 16A–16C and FIG. 17 illustrate various setup planning examples based on the exemplary sheet metal parts of FIGS. 4A–4C. In particular, FIGS. 16A, 16B and 16C illustrate independent press brake setup for the exemplary parts in FIGS. 4A, 4B and 4C, respectively. Further, FIG. 17 illustrates a composite setup plan for the exemplary parts of FIGS. 4A, 4B and 4C, using the multi-part setup planning features of the invention.

Both single-part and multi-part setup planning problems may be solved utilizing the various techniques and aspects of the present invention; and, thus, the present invention is not limited to solving only multi-part setup problems. That is, for a single-part setup plan, assume a given part W with an operation or bending sequence $O_w$ for the part W. In such a case, the tooling planner of the present invention will find the most compact press-brake setup. If no feasible setup exists, then the tooling planner may return a failure indication. An example of such a single-part setup planning problem for Part 1 of FIG. 4A is as follows:

W1: Part 1 (shown in FIG. 4A)

$O_{w1}$: [(b7)(b2,b3)(b4,b5)(b6)(b1)]

Further, the single-part setup planning problems for Part 2 of FIG. 4B and Part 3 of FIG. 4C may be stated as follows:

W2: Part 2 (shown in FIG. 4B), $O_{W2}$: [(b1)(b2,b3)(b4,b5)(b6)(b7)]

W3: Part 3 (shown in FIG. 4C), $O_{W3}$: [(b1)(b2)(b3)(b4)(b5)]

As noted above, the object is to determine the most efficient setup plan for the single-part setup planning problem. By applying the various operations and setup planning techniques of the invention to each of the exemplary parts of FIGS. 4A, 4B and 4C (i.e., Part 1, Part 2, and Part 3), individual setup plans may be generated for each part. FIGS. 16A, 16B and 16C illustrate exemplary, independent press brake setup solutions for Part 1, Part 2, and Part 3 of FIGS. 4A, 4B and 4C, respectively. Further, the setup plan data for each of these individual setup solutions is provided below in Table 2 in (B, T, P) format.

TABLE 2

Independent Setup Plans

| Part 1 | | | Part 2 | | | Part 3 | | |
|---|---|---|---|---|---|---|---|---|
| B | T | P | B | T | P | B | T | P |
| b7 | stage 2 | 50 | b1 | stage 3 | 0 | b1 | stage 1 | 10 |
| b2 | stage 2 | 0 | b2 | stage 1 | 0 | b2 | stage 1 | 30 |
| b3 | stage 1 | 0 | b3 | stage 2 | 50 | b3 | stage 1 | 0 |
| b4 | stage 2 | 0 | b4 | stage 1 | 0 | b4 | stage 1 | 30 |
| b5 | stage 1 | 0 | b5 | stage 2 | 0 | b5 | stage 1 | 0 |
| b1 | stage 2 | 0 | b6 | stage 1 | 2 | | | |
| b6 | stage 2 | 0 | b7 | stage 1 | −2 | | | |

In addition, multi-part setup planning problems may be solved utilizing the various techniques and aspects of the present invention. FIG. 17 illustrates a composite setup plan for the three exemplary parts of FIGS. 4A, 4B and 4C. The composite setup plan is based on the solution for a multi-part setup planning problem solved by the tooling planner of the present invention. Assume, for example, that there is given a set of parts Z and a set of operation sequences $O_Z$ for parts Z. In such a case, the object for this multi-part setup planning problem would be to find the most efficient composite setup which can be used to create every part in Z in accordance with the following:

Z: {Part 1, Part 2, Part 3} (shown in FIGS. 4A–4C)

$O_Z$: {(b7)(b2,b3)(b4,b5)(b1)(b6)],

[(b1)(b2,b3)b4,b5)(b6)(b7)],

[(b1)(b2)(b3)(b4)(b5)]}

Based on the features of the invention, FIG. 17 illustrates an exemplary, composite setup plan solution for the three exemplary parts of FIGS. 4A, 4B and 4C. In addition, the various data for the composite setup plan solution of FIG. 17 is provided below in Table 3 in (B, T, P) format. In the exemplary composite setup plan solution, all collinear bends have been assigned to the same group of stages. Further, in the data in Table 3, the lengths of the collinear stages (i.e., stage 1 and stage 2) are not equal to lengths of any collinear bends. Instead, lengths of collinear stages have been derived from composite constraints and are suitable in accommodating all collinear bends.

TABLE 3

Composite Setup Plan

| Part | B | T | P |
|---|---|---|---|
| Part 1 | b7 | stage 1 | 0 |
| Part 1 | b2 | stage 2 | 0 |
| Part 1 | b3 | stage 1 | 20 |
| Part 1 | b4 | stage 2 | 0 |
| Part 1 | b5 | stage 1 | 20 |
| Part 1 | b1 | stage 3 | 30 |
| Part 1 | b6 | stage 3 | 30 |
| Part 2 | b1 | stage 3 | 0 |
| Part 2 | b2 | stage 1 | 0 |
| Part 2 | b3 | stage 2 | 60 |
| Part 2 | b4 | stage 1 | 0 |
| Part 2 | b5 | stage 2 | 10 |
| Part 2 | b6 | stage 1 | 12 |
| Part 2 | b7 | stage 1 | −2 |
| Part 3 | b1 | stage 3 | 80 |
| Part 3 | b2 | stage 3 | 100 |
| Part 3 | b3 | stage 3 | 70 |

TABLE 3-continued

Composite Setup Plan

| Part | B | T | P |
|---|---|---|---|
| Part 3 | b4 | stage 3 | 100 |
| Part 3 | b5 | stage 3 | 70 |

As will be appreciated, the various features and aspects of the present invention can provide a significant improvement over current part-centric process planning systems and provide a unique process planning approach for mass customization. The multi-part setup planning techniques of the present invention can be used to significantly cut down the total number of required setups and increase the overall throughput of manufacturing facilities, including sheet metal bending manufacturing facilities.

While the invention has been described with reference to several exemplary embodiments, it is understood that the words which have been used herein are words of description and illustration, rather than words of limitation. Changes may be made, within the purview of the appended claims, as presently stated and as amended, without departing from the scope and spirit of the invention and its aspects. Although the invention has been described herein with reference to particular means, materials and embodiments, the invention is not intended to be limited to the particulars disclosed herein; rather, the invention extends to all fictionally equivalent structures, methods and uses, such as or within the scope of the appended claims.

What is claimed:

1. A method for multi-part setup planning for operations to be performed by a bending workstation on a plurality of sheet metal parts in accordance with a composite setup plan, said method comprising:

identifying setup constraints for operations to be performed on each of said plurality of parts;

determining, in accordance with the setup constraints that are identified, operations to be performed on said parts that have compatible setup constraints; and assigning operations that are determined to have compatible constraints to corresponding tooling stages of the bending workstation to develop a composite setup plan for said plurality of parts;

wherein each of the setup constraints comprises a set of setup constraint parameters, said setup constraint parameters defining setup constraints relating to the positioning of the parts in the workstation to perform said operations; and wherein said setup constraint parameters for each part comprise: a gap length "Gr" on a right side of a bend position of the part, which denotes the distance by which a tooling stage can be extended towards the right side of the bend position; a gap length "Gl" on a left side of the bend position of the part, which denotes the distance by which a tooling stage can be extended towards the left side of the bend; an obstruction length "Or" on the right side of the bend position, which denotes a space in which no tooling is allowed on the right side of the bend position; an obstruction length "Ol" on the left side of the bend position; which denotes a space in which no tooling is allowed on the left side of the bend position; a safety distance "Sr" on the right side of the bend position, which denotes a minimum distance between the bend position and a next tooling stage towards the right side of the bend position; and a safety distance "Sl" on the left side of the bend position, which denotes a minimum distance between the bend position and a next tooling stage towards the left side of the bend position.

2. A method for multi-part setup planning according to claim 1, wherein said determining includes identifying a set of said operations that have compatible setup constraints by locating tooling stages that can accommodate each operation within said set of operations.

3. A method for multi-part setup planning according to claim 1, wherein said setup constraint parameters for each part include tooling parameters, at least one of said tooling parameters being defined according to a minimum tooling stage length for each operation that is given by:

$$L-tolerance,$$

where "L" is a length of a bend line of the part, and "tolerance" is a predetermined tolerance amount.

4. A method for multi-part setup planning according to claim 1, wherein said setup constraint parameters for each part include tooling parameters, at least one of said tooling parameters being defined according to a maximum allowed tooling stage length for each operation that is given by:

$$Gr+Gl+L-clearance$$

where "L" is a length of a bend line at the bend position of the part, and "clearance" is a predetermined clearance amount.

5. A method for multi-part setup planning according to claim 1, wherein said setup constraints are identified in accordance with the following:

$$(Gr+Gl+L-clearance) \geq S \geq (L-tolerance),$$

$$Gl-0.5(clearance) \geq P,$$

$$Gr-0.5(clearance) \geq (S-P-L),$$

$$Sr \leq (S-P-L+Dr), \text{ and}$$

$$Sl \leq (P+Dl),$$

where "Dl" is a distance between a present tooling stage and a left adjacent tooling stage, "Dr" is a distance between the present tooling stage and a right adjacent tooling stage, "L" is the length of a bend line at the bend position of the part, "S" is a length of the present tooling stage, and "P" is a relative position of the bend line with respect to a left edge of the present tooling stage.

6. A method for multi-part setup planning according to claim 1, wherein said identifying includes determining each of the setup constraints based on an intermediate shape of the part and a configuration of the tooling of the bending workstation for each operation.

7. A method for multi-part setup planning according to claim 6, wherein said determining includes providing a geometric model of the intermediate shape of the part and the configuration of the tooling, and calculating part-tool intersection regions to determine setup constraint parameters for each operation.

8. A multi-part setup planning system for generating a composite setup plan for operations to be performed by a bending workstation on a plurality of sheet metal parts, said system comprising:

means for identifying setup constraints for operations to be performed on each of said plurality of parts;

means for determining, in accordance with the setup constraints that are identified by said identifying means, operations to be performed on said parts that have compatible setup constraints; and means for assigning operations that are determined to have compatible constraints to corresponding tooling stages of the bending workstation to thereby develop a composite setup plan for said plurality of parts;

wherein each of the setup constraints comprise a set of setup constraint parameters, said setup constraint parameters defining setup constraints relating to the positioning of the parts in the workstation to perform said operations; and wherein said setup constraint parameters for each part comprise: a gap length "Gr" on a right side of a bend position of the part, which denotes the distance by which a tooling stage can be extended towards the right side of the bend position; a gap length "Gl" on a left side of the bend position of the part, which denotes the distance by which a tooling stage can be extended towards the left side of the bend; an obstruction length "Or" on the right side of the bend position, which denotes a space in which no tooling is allowed on the right side of the bend position; an obstruction length "Ol" on the left side of the bend position; which denotes a space in which no tooling is allowed on the left side of the bend position; a safety distance "Sr" on the right side of the bend position, which denotes a minimum distance between the bend position and a next tooling stage towards the right side of the bend position; and a safety distance "Si" on the left side of the bend position, which denotes a minimum distance between the bend position and a next tooling stage towards the left side of the bend position.

9. A multi-part setup planning system according to claim 8, wherein said determining means comprises means for identifying a set of said operations that have compatible setup constraints by locating tooling stages that can accommodate each operation within said set of operations.

10. A multi-part setup planning system according to claim 8, wherein said setup constraint parameters for each part include tooling parameters, at least one of said tooling parameters being defined according to a minimum tooling stage length for each operation that is given by:

$$L - \text{tolerance},$$

where "L" is a length of a bend line of the part, and "tolerance" is a predetermined tolerance amount.

11. A multi-part setup planning system according to claim 8, wherein said setup constraint parameters for each part include tooling parameters, at least one of said tooling parameters being defined according to a maximum allowed tooling stage length for each operation that is given by:

$$Gr + Gl + L - \text{clearance},$$

where "L" is a length of a bend line at the bend position of the part, and "clearance" is a predetermined clearance amount.

12. A multi-part setup planning system according to claim 10, wherein said setup constraints are identified by said identifying means in accordance with the following:

$$(Gr + Gl + L - clearance) \geq -S \geq (L - tolerance),$$

$$Gl - 0.5(clearance) \geq P,$$

$$Gr - 0.5(clearance) \geq (S - P - L),$$

$$Sr \leq (S - P - L + Dr), \text{ and}$$

$$Sl \leq (P + Dl),$$

where "Dl" is a distance between a present tooling stage and a left adjacent tooling stage, "Dr" is a distance between the present tooling stage and a right adjacent tooling stage, "L" is the length of a bend line at the bend position of the part, "S" is a length of the present tooling stage, and "P" is a relative position of the bend line with respect to a left edge of the present tooling stage.

13. A multi-part setup planning system according to claim 8, wherein said identifying means comprises means for determining each of the setup constraints based on an intermediate shape of the part and a configuration of the tooling of the bending workstation for each operation.

14. A multi-part setup planning system according to claim 13, wherein said means for determining setup constraints comprises means for providing a geometric model of the intermediate shape of the part and the configuration of the tooling, and means for calculating part-tool intersection regions to determine setup constraint parameters for each operation.

15. A multi-part setup planning system according to claim 8, further comprising means for determining a tooling stage arrangement for said bending workstation, said stage arrangement determining means comprising means for identifying required tooling stages of the composite setup plan and means for generating an arrangement of the required tooling stages in the bending workstation to minimize a transfer frequency of said parts between the tooling stages.

16. A method for setup planning for operations to be performed by a workstation in accordance with a shared setup plan, said method comprising:

defining a family of parts;

identifying setup constraints imposed by operations to be performed on each part of said family of parts; and generating a shared setup plan that satisfies all of the setup constraints that are identified for said family of parts; said generating comprises:

determining, in accordance with the setup constraints that are identified, operations to be performed on said parts that have compatible setup constraints; and assigning operations that are determined to have compatible constraints to corresponding tooling stages of the workstation to develop the shared setup plan for said family of parts;

wherein said determining includes identifying a set of said operations that have compatible setup constraints by locating tooling stages that can accommodate each operation within said set of operations;

wherein each of the setup constraints comprises a set of setup constraint parameters, said setup constraint parameters defining setup constraints relating to the positioning of each part in the workstation to perform said operations; and said setup constraint parameters for each part comprise: a gap length "Gr" on a right side of a bend position of the part, which denotes the distance by which a tooling stage can be extended towards the right side of the bend position; a gap length "Gl" on a left side of the bend position of the part, which denotes the distance by which a tooling stage can be extended towards the left side of the bend; an obstruction length "Or" on the right side of the bend position, which denotes a space in which no tooling is allowed on the right side of the bend position; an obstruction length "Ol" on the left side of the bend position; which denotes a space in which no tooling is allowed on the left side of the bend position; a safety distance "Sr" on the right side of the bend position, which denotes a minimum distance between the bend position and a next tooling stage towards the right side of the bend position; and a safety distance "Sl" on the left side of the bend position, which denotes a minimum distance between the bend position and a next tooling stage towards the left side of the bend position.

17. A method for setup planning according to claim 16, wherein said setup constraint parameters for each part include tooling parameters, at least one of said tooling parameters being defined according to a minimum tooling stage length for each operation that is given by:

L−tolerance, where "L" is a length of a bend line of the part, and "tolerance" is a predetermined tolerance amount.

18. A method for setup planning according to claim 16, wherein said setup constraint parameters for each part include tooling parameters, at least one of said tooling parameters being defined according to a maximum allowed tooling stage length for each operation that is given by:

Gr+Gl+L−clearance, where "L" is a length of a bend line at the bend position of the part, and "clearance" is a predetermined clearance amount.

19. A method for setup planning according to claim 16, wherein said setup constraints are identified by said identifying in accordance with the following:

(Gr+Gl+L−clearance)≧S≧(L−tolerance),

Gl−0.5(clearance)≧P,

Gr−0.5(clearance)≧(S−P−L),

Sr≦(S−P−L+Dr), and

Sl≦(P+Dl), where "Dl" is a distance between a present tooling stage and a left adjacent tooling stage, "Dr" is a distance between the present tooling stage and a right adjacent tooling stage, "L" is the length of a bend line at the bend position of the part, "S" is a length of the present tooling stage, and "P" is a relative position of the bend line with respect to a left edge of the present tooling stage.

20. A method for setup planning according to claim 16, wherein said identifying includes determining each of the setup constraints based on an intermediate shape of the part and a configuration of the tooling of the workstation for each operation.

21. A method for setup planning according to claim 20, wherein said determining includes providing a geometric model of the intermediate shape of the part and the configuration of the tooling, and calculating part-tool intersection regions to determine setup constraint parameters for each operation.

22. A setup planning system for generating a shared setup plan for operations to be performed by a workstation, said system comprising:

means for defining a family of parts;

means for identifying setup constraints imposed by operations to be performed on each part of said family of parts; and means for generating a shared setup plan that satisfies all of the setup constraints that are identified for said family of parts;

wherein said generating means comprises:

means for determining, in accordance with the setup constraints that are identified, operations to be performed on said parts that have compatible setup constraints; and means for assigning operations that are determined to have compatible constraints to corresponding tooling stages of the workstation to develop the shared setup plan for said family of parts;

wherein said determining means includes means for identifying a set of said operations that have compatible setup constraints by locating tooling stages that can accommodate each operation within said set of operations;

wherein each of the setup constraints comprises a set of setup constraint parameters, said setup constraint parameters defining setup constraints relating to the positioning of each part in the workstation to perform said operations; and wherein said setup constraint parameters for each part comprise: a gap length "Gr" on a right side of a bend position of the part, which denotes the distance by which a tooling stage can be extended towards the right side of the bend position; a gap length "Gl" on a left side of the bend position of the part, which denotes the distance by which a tooling stage can be extended towards the left side of the bend; an obstruction length "Or" on the right side of the bend position, which denotes a space in which no tooling is allowed on the right side of the bend position; an obstruction length "Ol" on the left side of the bend position; which denotes a space in which no tooling is allowed on the left side of the bend position; a safety distance "Sr" on the right side of the bend position, which denotes a minimum distance between the bend position and a next tooling stage towards the right side of the bend position; and a safety distance "Si" on the left side of the bend position, which denotes a minimum distance between the bend position and a next tooling stage towards the left side of the bend position.

23. A setup planning system according to claim 22, wherein said setup constraint parameters for each part include tooling parameters, at least one of said tooling parameters being defined according to a minimum tooling stage length for each operation that is given by:

L−tolerance, where "L" is a length of a bend line of the part, and "tolerance" is a predetermined tolerance amount.

24. A setup planning system according to claim 22, wherein said setup constraint parameters for each part include tooling parameters, at least one of said tooling parameters being defined according to a maximum allowed tooling stage length for each operation that is given by:

Gr+Gl+L−clearance, where "L" is a length of a bend line at the bend position of the part, and "clearance" is a predetermined clearance amount.

25. A setup planning system according to claim 22, wherein said setup constraints are identified by said identifying means in accordance with the following:

$$(Gr+Gl+L-clearance) \geq S \geq (L-tolerance),$$

$$Gl-0.5(clearance) \geq P,$$

$$Gr-0.5(clearance) \geq (S-P-L),$$

$$Sr \leq (S-P-L+Dr), \text{ and}$$

$$Sl \leq (P+Dl),$$

where "Dl" is a distance between a present tooling stage and a left adjacent tooling stage, "Dr" is a distance between the present tooling stage and a right adjacent tooling stage, "L" is the length of a bend line at the bend position of the part, "S" is a length of the present tooling stage, and "P" is a relative position of the bend line with respect to a left edge of the present tooling stage.

26. A setup planning system according to claim 22, wherein said identifying means includes means for determining each of the setup constraints based on an intermediate shape of the part and a configuration of the tooling of the workstation for each operation.

27. A setup planning system according to claim 26, wherein said determining means includes means for providing a geometric model of the intermediate shape of the part and the configuration of the tooling, and means for calculating part-tool intersection regions to determine setup constraint parameters for each operation.

28. A method for multi-part setup planning for bending operations to be performed by a workstation on a plurality of sheet metal parts in accordance with a composite setup plan, said method comprising:
    defining a list O of operations to be performed on said plurality of parts; and
    repeating the following until said list O is empty;
        determining the most constraining operation o in said list O;
        identifying a set of operations c(o) in said list O which have compatible constraints with said most constraining operation o;
        defining a set of stages for the composite setup plan that satisfies the constraints for said most constraining operation o and said set of operations c(o);
        assigning said most constraining operation o and said set of operations c(o) to the set of stages of the composite setup plan; and
        removing said most constraining operation o and said set of operations c(o) from said list O.

29. A method for multi-part setup planning according to claim 28, wherein said determining comprises locating in said list O of operations a bending operation with a maximum bend line length, and assigning said bending operation with the maximum bend line length as the most constraining operation o in said list O.

30. A method for multi-part setup planning according to claim 40, wherein said determining comprises locating in said list O of operations a collinear bending operation with a maximum interruption index, and assigning said collinear bending operation with the maximum interruption index as the most constraining operation o in said list O.

31. A method for multi-part setup planning according to claim 28, wherein said identifying of operations with compatible constraints includes determining setup constraints for said list O of operations, each of the setup constraints comprising a set of setup constraints parameters that define setup constraints relating to the positioning of a part in the workstation to perform the bending operations.

32. A method for multi-part setup planning according to claim 31, wherein said setup constraint parameters include tooling parameters, at least one of said tooling parameters being defined according to a minimum tooling stage length for each operation that is given by:

$$L-tolerance,$$

where "L" is a length of a bend line of the part, and "tolerance" is a predetermined tolerance amount.

33. A method for multi-part setup planning according to claim 31, wherein said setup constraint parameters include tooling parameters, at least one of said tooling parameters being defined according to a maximum allowed tooling stage length for each operation that is given by:

$$Gr+Gl+L-clearance,$$

where "Gr" is a gap length on a right side of a bend position of the part, "Gl" is a gap length on a left side of the bend position of the part, "L" is a length of a bend line at the bend position the part and "clearance" is a predetermined clearance amount.

34. A method for multi-part setup planning according to claim 31, wherein said setup constraint parameters comprise: a gap length "Gr" on a right side of a bend position of the part, which denotes the distance by which a tooling stage can be extended towards the right side of the bend position; a gap length "Gl" on a left side of the bend position of the part, which denotes the distance by which a tooling stage can be extended towards the left side of the bend; an obstruction length "Or" on the right side of the bend position, which denotes a space in which no tooling is allowed on the right side of the bend position; an obstruction length "Ol" on the left side of the bend position; which denotes a space in which no tooling is allowed on the left side of the bend position; a safety distance "Sr" on the right side of the bend position, which denotes a minimum distance between the bend position and a next tooling stage towards the right side of the bend position; and a safety distance "Sl" on the left side of the bend position, which denotes a minimum distance between the bend position and a next tooling stage towards the left side of the bend position.

35. A method for multi-part setup planning according to claim 34, wherein said setup constraints are determined in accordance with the following:

$$(Gr+Gl+L-clearance) \geq S \geq (L-tolerance),$$

$$Gl-0.5(clearance) \geq P,$$

$$Gl-0.5(clearance) \geq (S-P-L),$$

$$Sr \leq (S-P-L+Dr), \text{ and}$$

$$Sl \leq (P+Dl),$$

where "Dl" is a distance between a present tooling stage and a left adjacent tooling stage, "Dr" is a distance between the present tooling stage and a right adjacent tooling stage, "L" is the length of a bend line at the bend position of the part, "S" is a length of the present tooling stage, and "P" is a relative position of the bend line with respect to a left edge of the present tooling stage.

36. A method for multi-part setup planning according to claim 31, wherein said identifying operations with compatible constraints comprises determining that an operation I and an operation j are compatible when there exists a range of relative positions which satisfy the following:

$$XL_{j,i} \geq X_j - X_i \geq XR_{j,i}$$

where "$X_i$" is a reference position of operation I, "$X_j$" is a reference position of operation j, "$XL_{j,i}$" is a leftmost position of operation j with respect to operation I, and "$XR_{j,i}$" is a rightmost position of operation j with respect to operation I.

37. A method for multi-part setup planning according to claim 31, wherein said identifying operations with compatible constraints comprises determining that a plurality of operations n are compatible when there exists a vector $\{X_1, X_2, \ldots, X_n\}$ which satisfies the following for every pair of operations i,j (where I does not equal j) of said plurality of bending operations n:

$$X_j - X_i \leq XR_{j,i}$$
$$X_i - X_j \leq -XL_{j,i}$$

where "$X_i$" is a reference position of operation, "$X_j$" is a reference position of operation j, "$XL_{j,i}$" is a leftmost position of operation j with respect to operation I, and "$XR_{j,i}$" is a rightmost position of operation j with respect to operation I.

38. A method for multi-part setup planning according to claim 28, wherein said identifying operations with compatible constraints comprises locating tooling stages of the workstation that can accommodate each operation of said set of operations c(o) and said most constraining operation o.

* * * * *